(12) United States Patent  
Iwata et al.

(10) Patent No.: US 9,664,819 B2  
(45) Date of Patent: May 30, 2017

(54) OPTICAL ELEMENT, AND ANTIREFLECTIVE STRUCTURE AND PROCESS FOR PRODUCTION THEREOF

(75) Inventors: Noboru Iwata, Osaka (JP); Teruhisa Kotani, Osaka (JP); Tazuko Kitazawa, Osaka (JP); Yoshiteru Murakami, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 546 days.

(21) Appl. No.: 13/639,235

(22) PCT Filed: Feb. 2, 2011

(86) PCT No.: PCT/JP2011/052166  
§ 371 (c)(1),  
(2), (4) Date: Oct. 4, 2012

(87) PCT Pub. No.: WO2011/125367  
PCT Pub. Date: Oct. 13, 2011

(65) Prior Publication Data  
US 2013/0027780 A1    Jan. 31, 2013

(30) Foreign Application Priority Data  
Apr. 6, 2010  (JP) .................... 2010-088069

(51) Int. Cl.  
*G02B 1/10* (2015.01)  
*G02B 1/118* (2015.01)

(52) U.S. Cl.  
CPC .................... *G02B 1/118* (2013.01)

(58) Field of Classification Search  
CPC .............. G02B 1/118; G02B 5/02–5/0294

USPC ................... 359/577–590, 601–614  
See application file for complete search history.

(56) References Cited

U.S. PATENT DOCUMENTS 4,589,972 A * 5/1986 Pompea ............... C25D 11/16  
                                                                  126/908  
5,120,605 A * 6/1992 Zuel ..................... C03C 15/00  
                                                                   216/97  
5,208,599 A * 5/1993 Rudduck ............. H01Q 17/008  
                                                                   342/1

(Continued)

FOREIGN PATENT DOCUMENTS

JP      2001-272505 A     10/2001  
JP      2001-517319 A     10/2001  
(Continued)

OTHER PUBLICATIONS

English Machine Translation of JP 2008-122435.*  
(Continued)

*Primary Examiner* — Bumsuk Won  
*Assistant Examiner* — Jeffrey Madonna  
(74) *Attorney, Agent, or Firm* — Harness, Dickey & Pierce, P.L.C.

(57) ABSTRACT

An antireflective structure having a higher antireflective effect compared with those of conventional antireflective structures is produced by a simple process. The antireflective structure (10) includes a plurality of concavities (2a) each having a plurality of convexities (1a) thereon, and a pitch between the plurality of convexities (1a) and a pitch between the plurality of concavities (2a) are smaller than a wavelength of light incident to the antireflective structure (10).

11 Claims, 12 Drawing Sheets

(56) References Cited

U.S. PATENT DOCUMENTS

| | | | |
|---|---|---|---|
| 6,130,777 A * | 10/2000 | Yamashita | B29D 11/00278 359/456 |
| 6,163,405 A * | 12/2000 | Chang | G02B 5/0215 349/113 |
| 6,359,735 B1 | 3/2002 | Gombert et al. | |
| 6,929,861 B2 * | 8/2005 | Lin | C03C 15/00 428/149 |
| 2003/0102286 A1 | 6/2003 | Takahara et al. | |
| 2007/0159698 A1 * | 7/2007 | Taguchi | G02B 1/118 359/586 |
| 2009/0127095 A1 | 5/2009 | Iwata et al. | |
| 2010/0026016 A1 * | 2/2010 | Tejszerski | E05B 65/0007 292/259 R |
| 2010/0027294 A1 * | 2/2010 | Lee | G02B 5/045 362/620 |
| 2010/0055397 A1 | 3/2010 | Kurihara et al. | |
| 2010/0165468 A1 * | 7/2010 | Yamada et al. | 359/613 |
| 2011/0003121 A1 | 1/2011 | Tsuda | |
| 2011/0100827 A1 * | 5/2011 | Hayashi et al. | 205/112 |
| 2011/0235181 A1 | 9/2011 | Hayashibe et al. | |
| 2012/0069443 A1 * | 3/2012 | Taguchi | G02B 1/118 359/601 |
| 2012/0268822 A1 * | 10/2012 | Law | G02B 1/12 359/580 |

FOREIGN PATENT DOCUMENTS

| | | |
|---|---|---|
| JP | 2008-122435 A | 5/2008 |
| JP | 2008-143162 A | 6/2008 |
| JP | 2009-129492 A | 6/2009 |
| JP | WO2009/147858 * | 12/2009 |
| WO | WO-2009-144970 A1 | 12/2009 |
| WO | WO-2010-035855 A1 | 4/2010 |

OTHER PUBLICATIONS

Bradley, et al. "Theory of ripple topography induced by ion bombardment" *J. Vac. Sci. Technol.*, p. 2390-2395, A6(4), Jul./Aug. 1998.

International Search Report in International Application No. PCT/JP2011/052166 issued Mar. 8, 2011.

Various Authors. *Binary Alloy Phase Diagrams Second Edition* vol. 3, pp. 1968, 1972, 2018, 2020, 2666, 2767, 3365, 3376, and 3378, 1990, ASM.

* cited by examiner

OPTICAL ELEMENT, AND ANTIREFLECTIVE STRUCTURE AND PROCESS FOR PRODUCTION THEREOF

CROSS-REFERENCE TO RELATED APPLICATIONS

This application is the U.S. national phase, pursuant to 35 U.S.C. §371, of PCT international application Ser. No. PCT/JP2011/052166, filed Feb. 2, 2011, designating the United States and published in Japanese on Oct. 13, 2011 as publication WO2011/125367. PCT/JP2011/052166 claims priority to Japanese Patent Application Ser. No. 2010-088069, filed Apr. 6, 2010. The entire contents of the aforementioned patent applications are incorporated herein by reference.

TECHNICAL FIELD

The present invention relates to an antireflective structure for preventing reflection of light and a process for production thereof, and to an optical element including the antireflective structure.

BACKGROUND ART

Examples of optical elements to which light is incident or from which light is emitted include: electronic devices such as semiconductor lasers, light-emitting diodes, optical sensors, and solar cells; glasses used for display; and optical members such as lenses and polarization plates.

In order that light incident to or emitted from such optical element (incident light or emission light) is not reflected by the interface between the optical element and the outside, such optical element is provided with an antireflective structure on its surface.

One of such antireflective structures is known as a "moth-eye" structure having thereon a repetition of a concave and convex structure with a cycle shorter than the wavelength of incident light or emission light in order to gradually change refractive index of light in the travelling direction of the light, thereby reducing reflectance.

As a process for producing such a structure, Patent Literature 1 discloses a process for surface treatment using a dot-arrayed metal mask.

Furthermore, Patent Literature 2 discloses a process for producing an antireflective structure by carrying out reactive etching using island-shaped metal fine particles as masks.

Furthermore, Patent Literature 3 discloses that formation of a structure larger than the wavelength of incident light (macro structure) and a structure smaller than the wavelength of incident light (micro structure) enables a moth-eye structure to yield a higher antireflective effect. The micro structure is smaller than 250 nm, and the macro structure is approximately 10 to 100 times larger than the wavelength of incident light.

Patent Literature 4 discloses a process for simply forming fine particles in such a manner that periodic patterns of highly uniformed magnetic particles are formed at once, although the fine particles are not disclosed as an antireflective structure.

Furthermore, Non-patent Literature 1 discloses a ripple shape formed on an Si substrate when the Si substrate is placed inside an ion beam sputtering device and Ar ions are radiated in a skew direction with respect to the surface of the substrate.

Furthermore, Non-patent Literature 2 discloses binary alloy phase diagrams of various elements.

CITATION LIST

Patent Literatures

Patent Literature 1
Japanese Patent Application Publication No. 2001-272505 (published on Oct. 5, 2001)
Patent Literature 2
Japanese Patent Application Publication No. 2008-143162 (published on Jun. 26, 2008)
Patent Literature 3
Japanese Translation of PCT International Application No. 2001-517319 (published on Oct. 2, 2001)
Patent Literature 4
Japanese Patent Application Publication No. 2009-129492 (published on Jun. 11, 2009)

Non-Patent Literatures

Non-Patent Literature 1
"Theory of ripple topography induced by ion bombardment" J. Vac. Sci. Technol., p. 2390-2395, A6(4), July/August, 1998
Non-Patent Literature 2
Binary Alloy Phase Diagrams Second Edition Volume 3, p. 1968, 1972, 2018, 2020, 2666, 2767, 3365, 3376, and 3378, 1990, ASM

SUMMARY OF INVENTION

Technical Problem

Patent Literature 1 discloses a process for forming a dot-arrayed metal mask on an optical element and carrying out reactive ion etching to form a conical shape on the optical element. In the process, drawing by an electron beam is made in order to form the metal mask. Consequently, formation of an antireflective structure requires many steps and devices, such as a step of applying an electron beam resist on an optical substrate, a step of drawing by an electron beam, a step of depositing a metal, a step of removing the electron beam resist, and a step of reactive ion etching. This raises a problem of complicated production steps and complicated production devices.

In the invention of Patent Literature 2, metallic fine particles are formed in the form of islands using agglomeration and decomposition of a thin film substance or nucleus formation of the thin film substance and reactive etching is carried out using the island-shaped metallic fine particles as masks. Accordingly, the invention of Patent Literature 2 does not require drawing by an electron beam as described in Patent Literature 1.

However, formation of metallic fine particles in an island shape requires thermal reaction, optical reaction, or gas reaction, and since a relatively large energy is required to be supplied in order to change the substance once formed in the form of a thin film to have an island shape, it is difficult for the invention of Patent Literature 2 to employ the process when the base substance is made of a material with low resistance against heat, light with high intensity, or gas.

Furthermore, in order to yield an antireflective effect, a step of forming one or more etching transfer layers on a substrate, a step of forming a thin film substance, a step of making the thin substance have an island shape, and a step of reactive etching are required, resulting in completed production step and complicated devices similarly with Patent Literature 1.

In the invention of Patent Literature 3, different steps are required for forming a macro structure and a micro structure, respectively, on an antireflective plane. Specifically, Patent Literature 3 describes that the macro structure is coated with a photoresist layer exposed mechanically, chemically, or in other form, and that the micro structure is obtained by coating such a preliminarily treated base substance plane with a photoresist layer if necessary, and thereafter exposing the layer.

As described above, the technique described in Patent Literature 3 includes the step of forming the macro structure, the step of applying the photoresist layer, the step of forming the micro structure by exposure, the step of formation by transferring the structure, resulting in complicated production steps and complicated production devices similarly with the inventions of Patent Literatures 1 and 2.

As described above, in the conventional techniques, the steps for forming an antireflective structure and devices for the steps are complicated, so that the antireflective structure cannot be formed easily. Besides, the invention of Patent Literature 2 suffers a problem that the invention is not applicable when the base substance is made of a material with low resistance against heat, light with high intensity, and gas.

Furthermore, the antireflective effect of the conventional antireflective structure is not sufficient. So, an antireflective structure with higher antireflective effect is desired.

The present invention was made in view of the foregoing problems. An object of the present invention is to provide a process for simply producing an antireflective structure having a higher antireflective effect than conventional one and an antireflective structure.

Solution to Problem

In order to solve the foregoing problems, an antireflective structure of the present invention is an antireflective structure for preventing reflection of light, comprising a plurality of large concavities each having a plurality of small convexities thereon, a pitch between the plurality of small convexities and a pitch between the plurality of large concavities being smaller than a wavelength of light incident to the antireflective structure.

With the arrangement, the antireflective structure of the present invention includes a plurality of large concavities, and each of the plurality of large concavities has a plurality of small convexities on the surface thereof. It naturally follows that the width of the large concavity is larger than the width of the small convexity.

The pitch between the small convexities (distance between peaks of the convexities) and the pitch between the large concavities (distance between centers of the concavities) are smaller than the wavelength of light incident to the antireflective structure (i.e. light transmitted by the antireflective structure). It naturally follows that the width of the small convexity and the width of the large concavity are smaller than the width of the incident light.

Since the plurality of large concavities exist on the surface of the antireflective structure with a pitch smaller than the wavelength of the incident light, large concavities and convexities smaller than the wavelength of the incident light are formed. The large concavities and convexities serve as a moth-eye structure.

In addition, since the plurality of small convexities exist on the surface of each of the plurality of large concavities with a pitch smaller than the wavelength of the incident light, small concavities and convexities smaller than the wavelength of the incident light are formed. The small concavities and convexities also serve as a moth-eye structure.

That is, the antireflective structure has a moth-eye structure consisting of the large concavities and convexities and a moth-eye structure consisting of the small concavities and convexities on the surface of the large concavities and convexities.

Therefore, the above configuration can yield a higher antireflective effect than a conventional configuration having a single moth-eye structure. In fact, the inventors of the present invention confirmed by experiment that the above configuration can yield a higher antireflective effect against incident light with a wavelength ranging from an ultraviolet region to a near-infrared region.

In general, a larger aspect ratio of convexities and concavities (height of a convex and concave structure/width of a concavity (or convexity)) provides a higher antireflective effect. Since the present invention can yield a higher antireflective effect than a conventional antireflective structure, the present invention can reduce the vertical interval of a convex and concave structure when forming an antireflective structure yielding the same antireflective effect as a conventional antireflective structure.

Furthermore, the process for production of the present invention can consecutively form small convexities and large concavities by successively carrying out substantially a single process, so that the antireflective structure can be produced with an extremely simple process.

In order to solve the foregoing problems, an antireflective structure of the present invention is an antireflective structure for preventing reflection of light, comprising a plurality of large convexities each having a plurality of small concavities thereon, a pitch between the plurality of small concavities and a pitch between the plurality of large convexities being smaller than a wavelength of light incident to the antireflective structure.

This configuration corresponds to a case where the aforementioned antireflective structure having a plurality of small convexities and a plurality of large convexities is transferred to other base substance, and includes a plurality of large convexities each having a plurality of small concavities thereon, which is inverted with respect to the aforementioned antireflective structure.

Even when the convex and concave structure is reversed in terms of relation between a convexity and a concavity, the reversed concave and convex structure can yield an antireflective effect similar to that of the above antireflective structure.

In order to solve the foregoing problems, a process of the present invention for production of an antireflective structure is a process for production of an antireflective structure by forming an antireflective structure on a surface of a base substance, comprising the steps of: (i) ejecting molecules or atoms of a base substance material constituting the base substance by etching the surface of the base substance, and at a same time supplying from a supply source a supply material which is to be combined with the base substance material to form particles; and (ii) forming a plurality of convexities on the surface of the base substance with a pitch smaller than a wavelength of light incident to the antireflective structure by mixing the base substance material ejected in the step (i) with the supply material supplied in the step (i), the step (i) and the step (ii) being carried out repeatedly so that a plurality of concavities each having the plurality of convexities thereon are formed on the surface of the base substance with a pitch smaller than the wavelength of the light.

With the arrangement, the base substance material obtained by etching the surface of the base substance is mixed (more preferably chemically reacts) with the supply material from the supply source to form a plurality of convexities on the surface of the base substance. The plurality of convexities are formed with a pitch smaller than the wavelength of light incident to the antireflective structure (incident light). In other words, the distance between peaks of the plurality of convexities is smaller than the wavelength of incident light.

By successively repeating the step of forming the convexities (i.e. by successively repeating the step of supplying and the step of forming the convexities), a plurality of concavities each having a plurality of convexities thereon are formed. The plurality of concavities are formed with a pitch smaller than the wavelength of light incident to the antireflective structure.

Concavities and convexities made of the plurality of convexities and concavities and convexities made of the plurality of concavities serve as moth-eye structures, respectively.

Therefore, the present invention can produce an antireflective structure yielding a higher antireflective effect than a conventional configuration having a single moth-eye structure.

Furthermore, the step of supplying and the step of forming convexities are included in substantially a single process, and successively repeating the process allows consecutively forming the convexities and concavities. Accordingly, the present invention can produce, by an extremely simple process, an antireflective structure yielding a higher antireflective structure than conventional one.

Advantageous Effects of Invention

As described above, the antireflective structure of the present invention includes a plurality of large concavities each having a plurality of small convexities thereon, and the pitch between the plurality of small convexities and the pitch between the plurality of large concavities are smaller than the wavelength of light incident to the antireflective structure.

Therefore, the present invention can yield a higher antireflective effect than a conventional configuration having a single moth-eye structure.

The process of the present invention for production of an antireflective structure comprises the steps of: (i) ejecting molecules or atoms of a base substance material constituting the base substance by etching the surface of the base substance, and at a same time supplying from a supply source a supply material which is to be combined with the base substance material to form particles; and (ii) forming a plurality of convexities on the surface of the base substance with a pitch smaller than a wavelength of light incident to the antireflective structure by mixing the base substance material ejected in the step (i) with the supply material supplied in the step (i)e, the step (i) and the step (ii) being carried out repeatedly so that a plurality of concavities each having the plurality of convexities thereon are formed on the surface of the base substance with a pitch smaller than the wavelength of the light.

The step of supplying and the step of forming convexities are included in substantially a single process, and successively repeating the process allows consecutively forming the convexities and concavities. Accordingly, the present invention can produce, by an extremely simple process, an antireflective structure yielding a higher antireflective structure than conventional one.

BRIEF DESCRIPTION OF DRAWINGS (a) of FIG. 1 is a cross sectional view schematically showing a structure of an antireflective structure at its initial stage of production. (b) of FIG. 1 is a cross sectional view schematically showing a cross section of an antireflective structure of the present invention.

Figure 9:
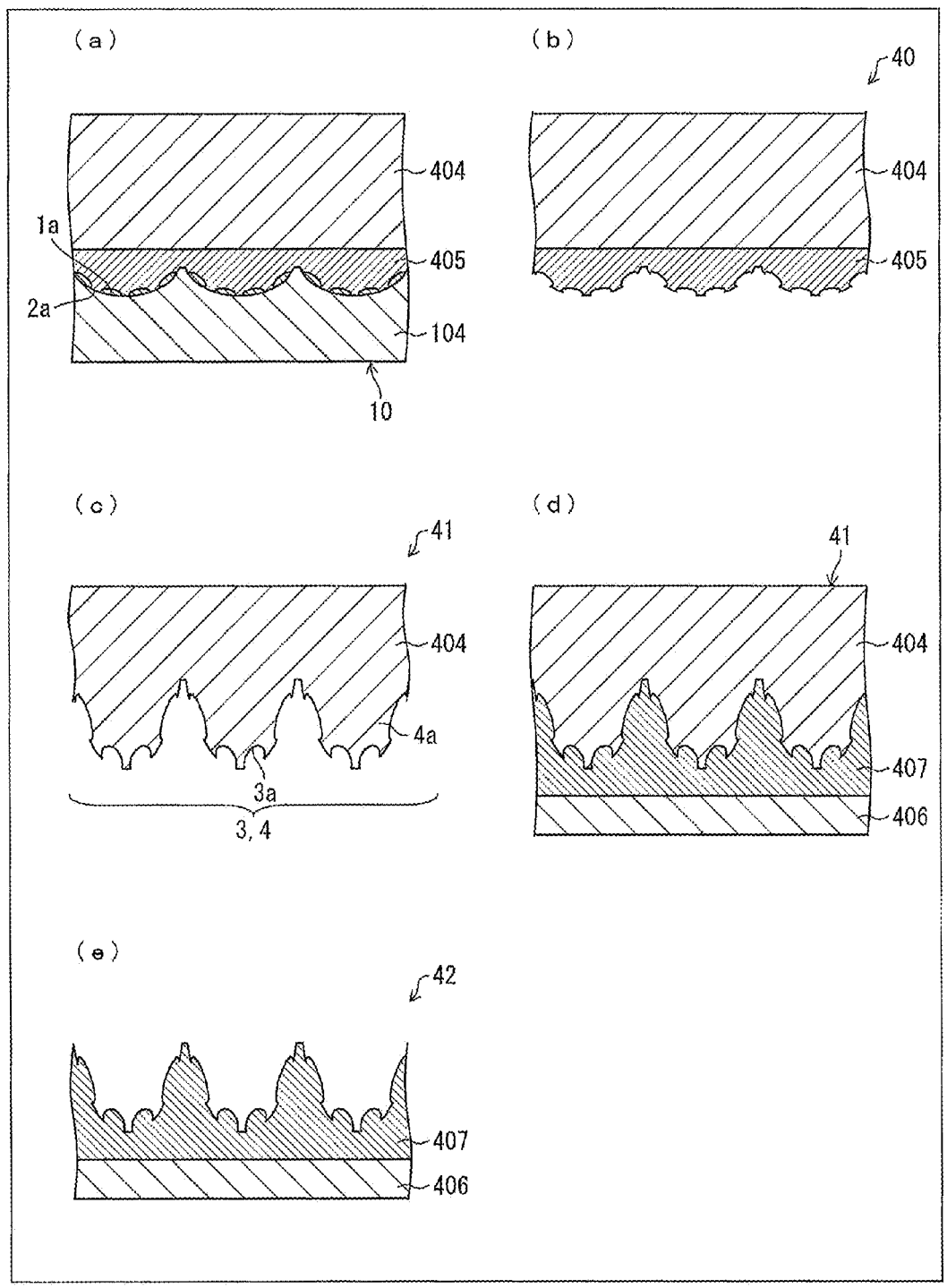

(a) to (e) of FIG. 9 are cross sectional views showing individual steps of a process for production of an antireflective structure in accordance with another embodiment of the present invention.

Figure 10:
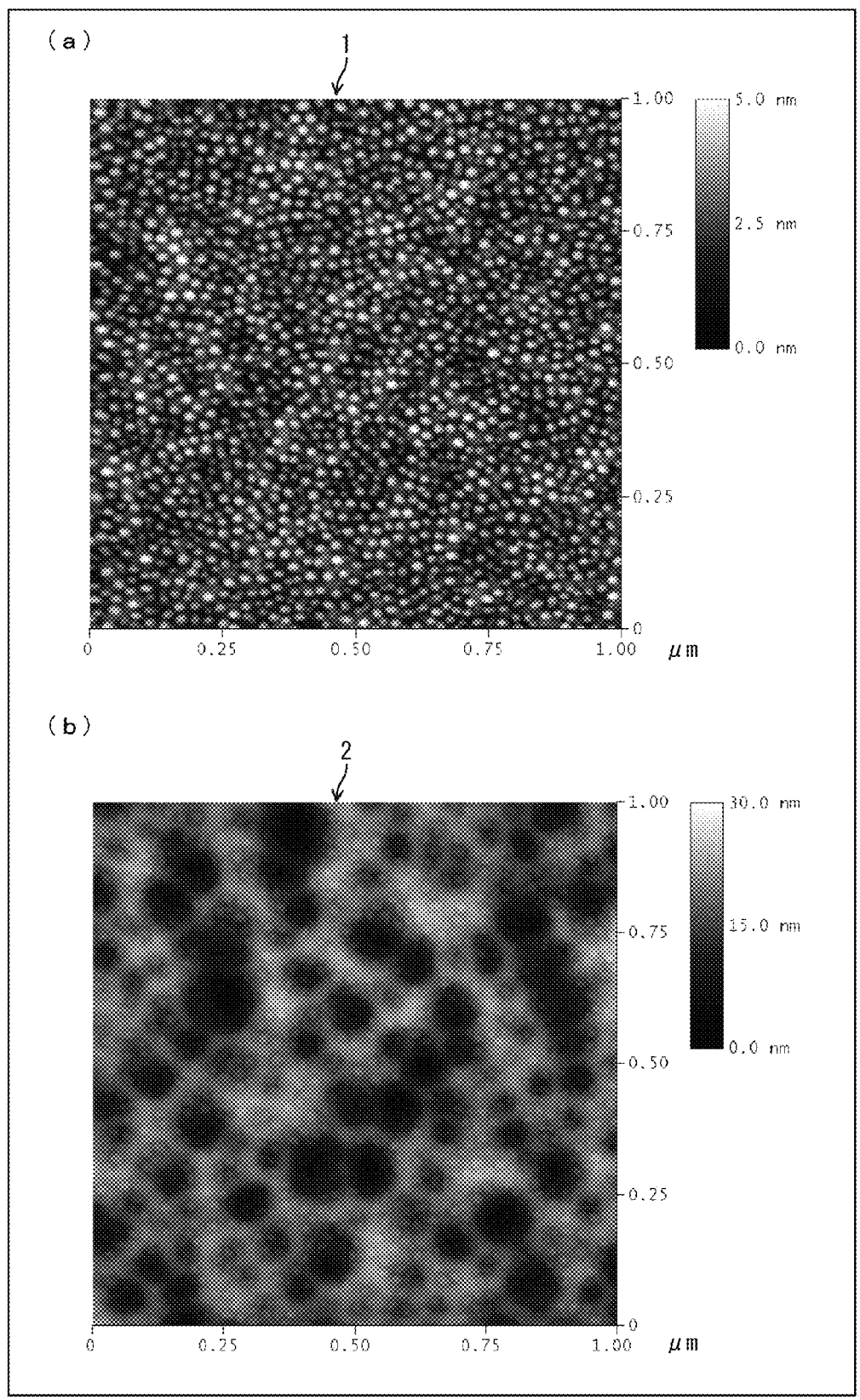

(a) of FIG. 10 is a view showing an image obtained by observation with AFM in scanning range of 1 μm square of a surface of a first convex structure of an antireflective structure produced in an Example of the present invention. (b) of FIG. 10 is a view showing an image obtained by observation with AFM in scanning range of 1 μm square of a surface of a second concave structure.

Figure 11:
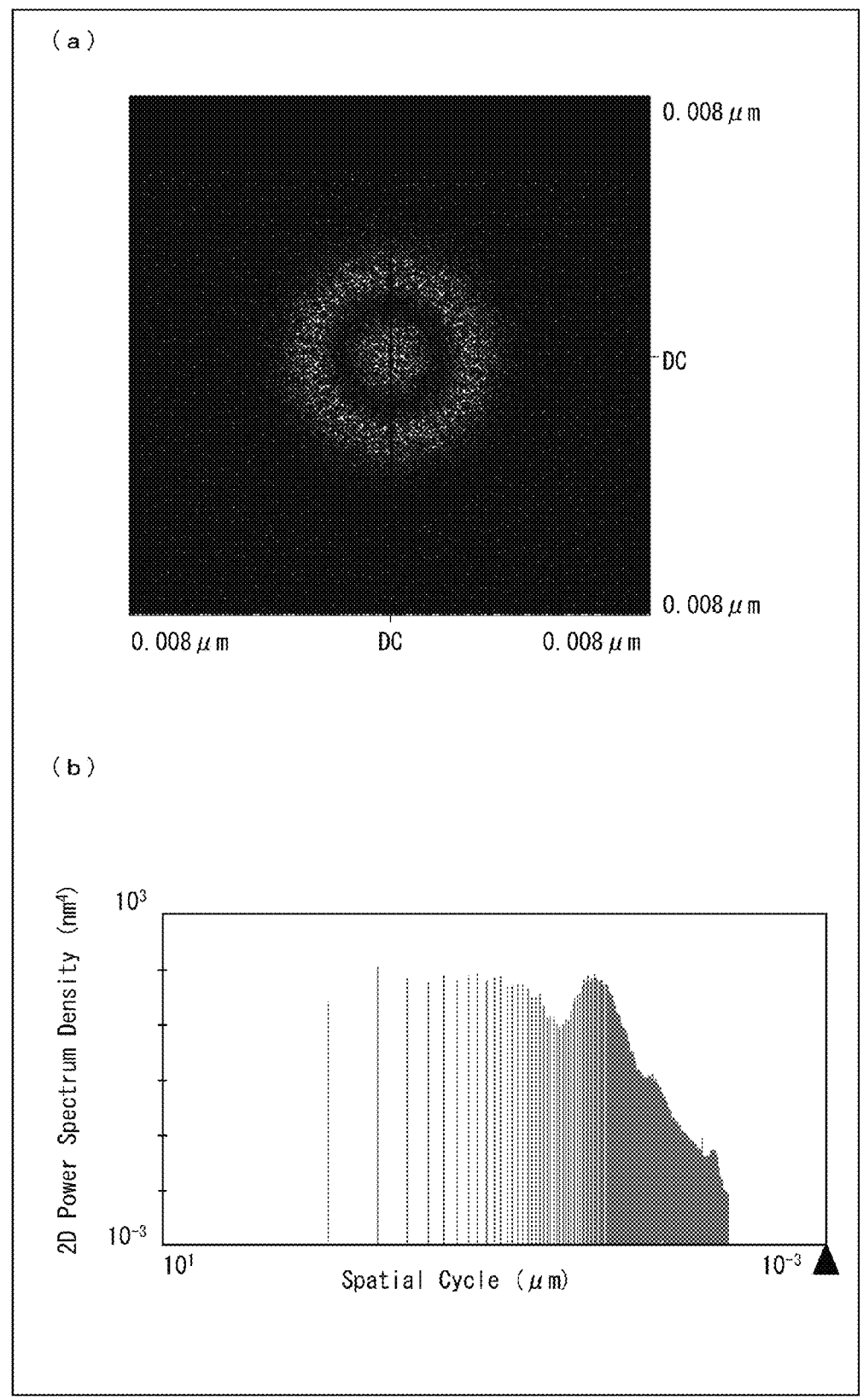

(a) of FIG. 11 is a view showing a spectrum obtained by subjecting the result of measurement with AFM of the first convex structure in the Example to 2D Fourier transformation. (b) of FIG. 11 is a view showing a power spectrum density.

Figure 12:
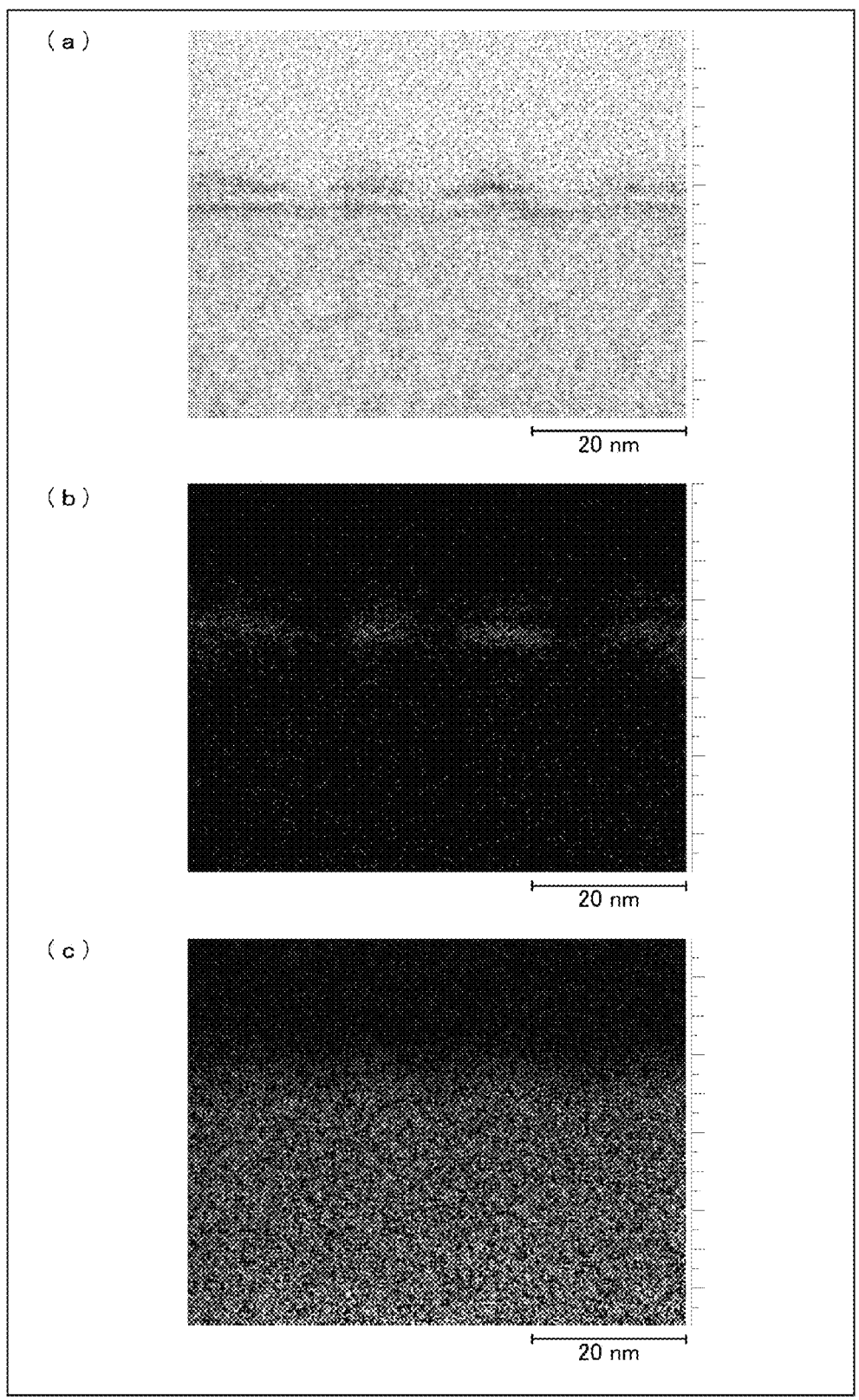

(a) of FIG. 12 is a view showing a cross sectional image of the first convex structure of the Example observed with a transmission electron microscope. (b) of FIG. 12 is a view showing an EDX mapping image of Ta. (c) of FIG. 12 is a view showing an EDX mapping image of Si.

Figure 13:
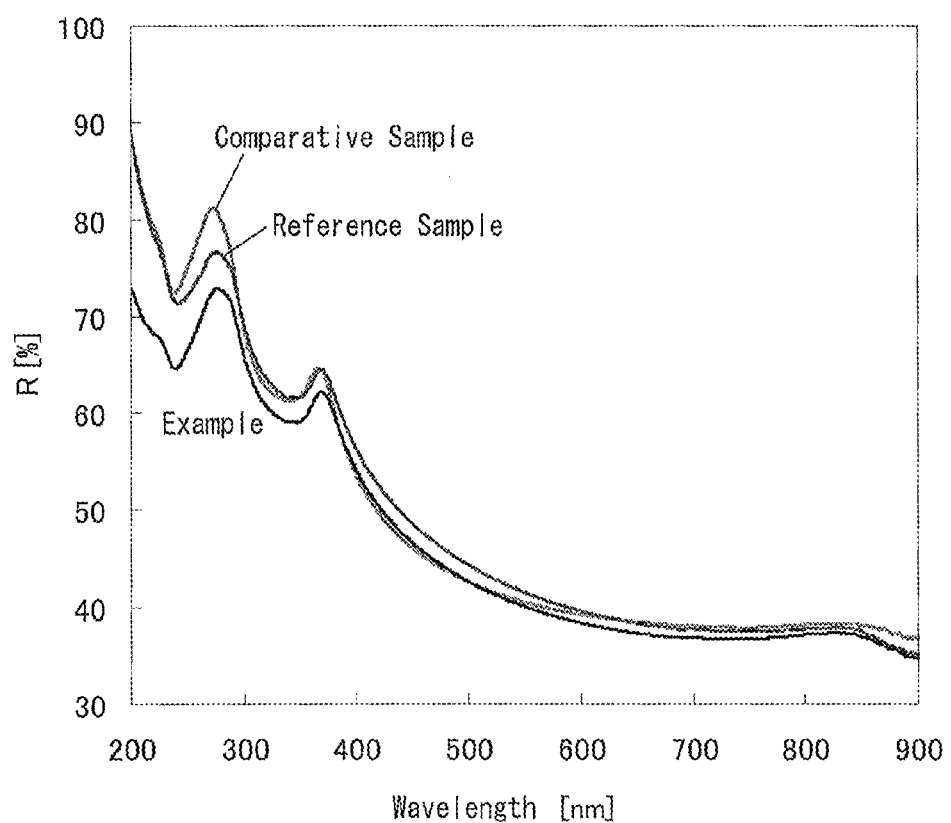

FIG. 13 shows the result of measurement of reflectance of the antireflective structure produced in the Example, along with the results of measurements of a comparative sample and a reference sample.

Figure 14:
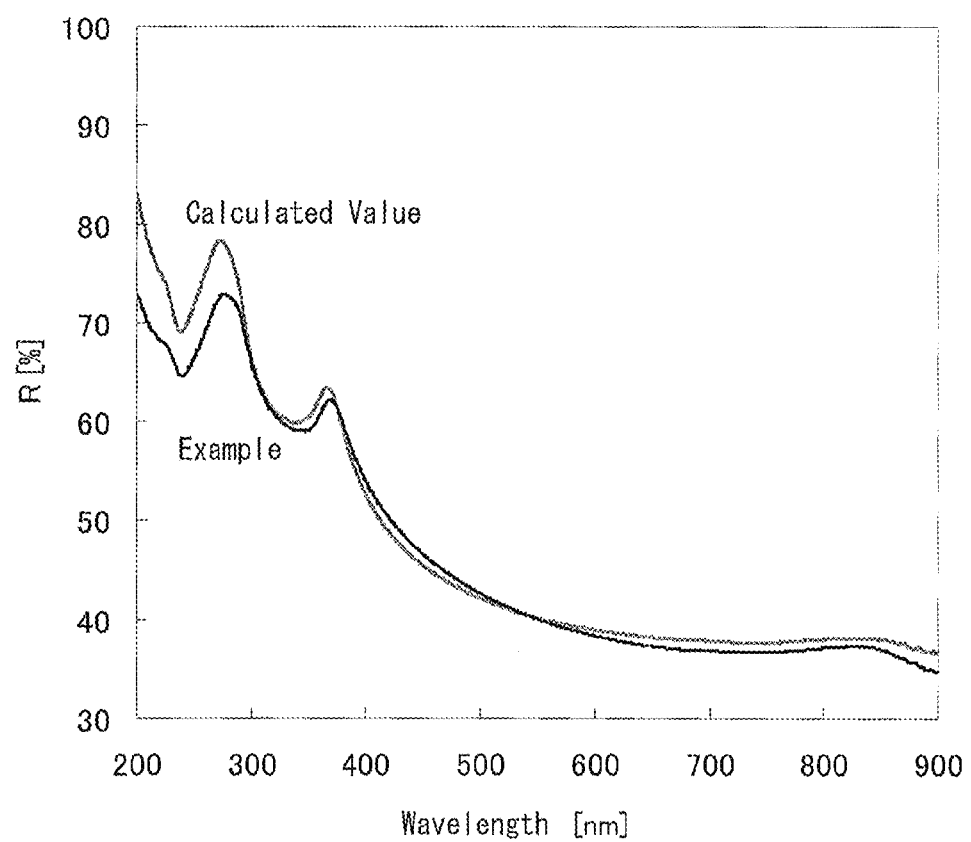

FIG. 14 is a graph showing the result of measurement of reflectance of the antireflective structure produced in the Example, along with a calculated value of estimated reflectance in a case of hypothecating only the second concave structure was formed.

Figure 15:
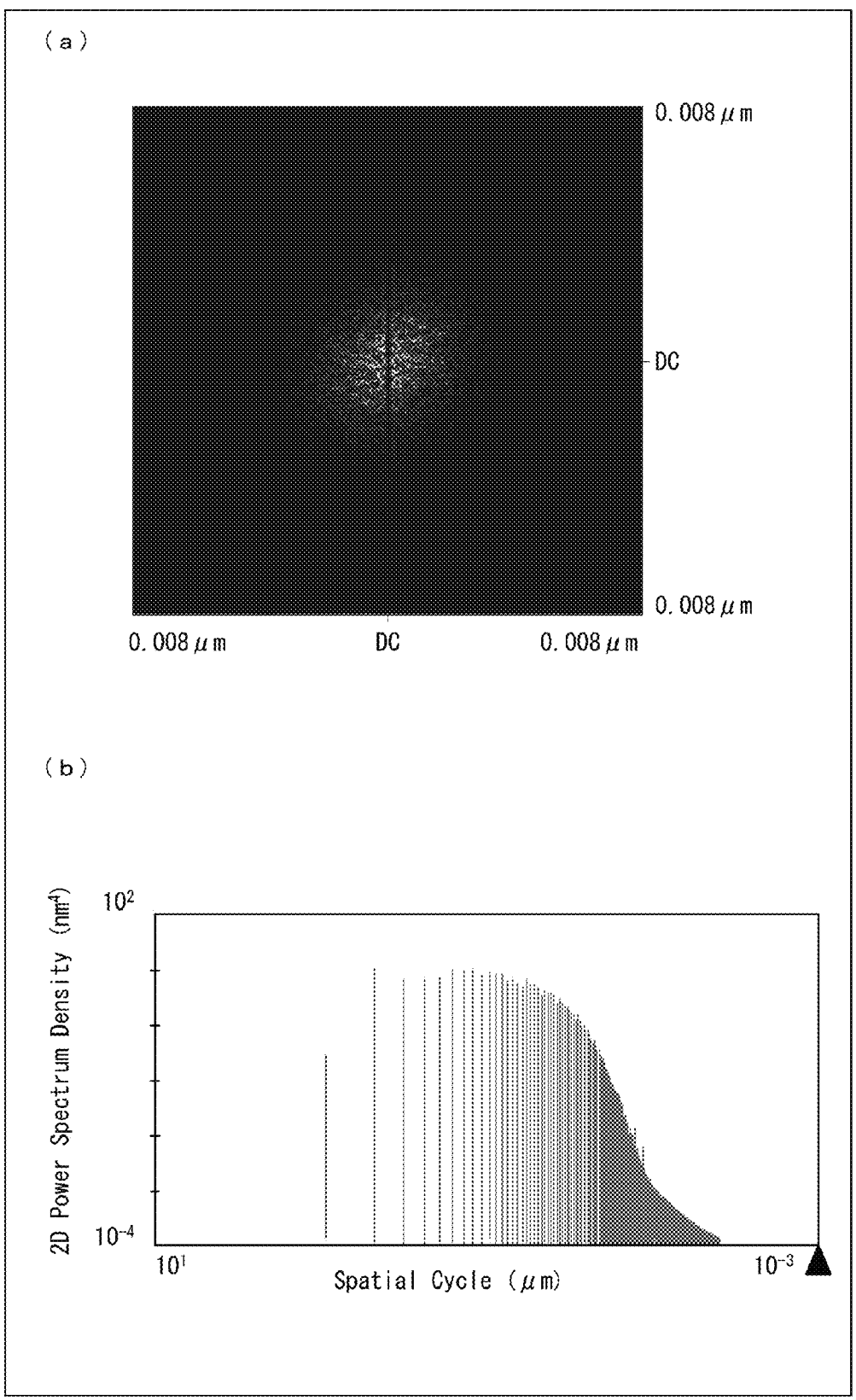

(a) of FIG. 15 is a view showing a spectrum obtained by subjecting the result of measurement with AFM of a base substance in a Reference Example of the present invention to 2D Fourier transformation. (b) is a view showing a power spectrum density.

Figure 16:
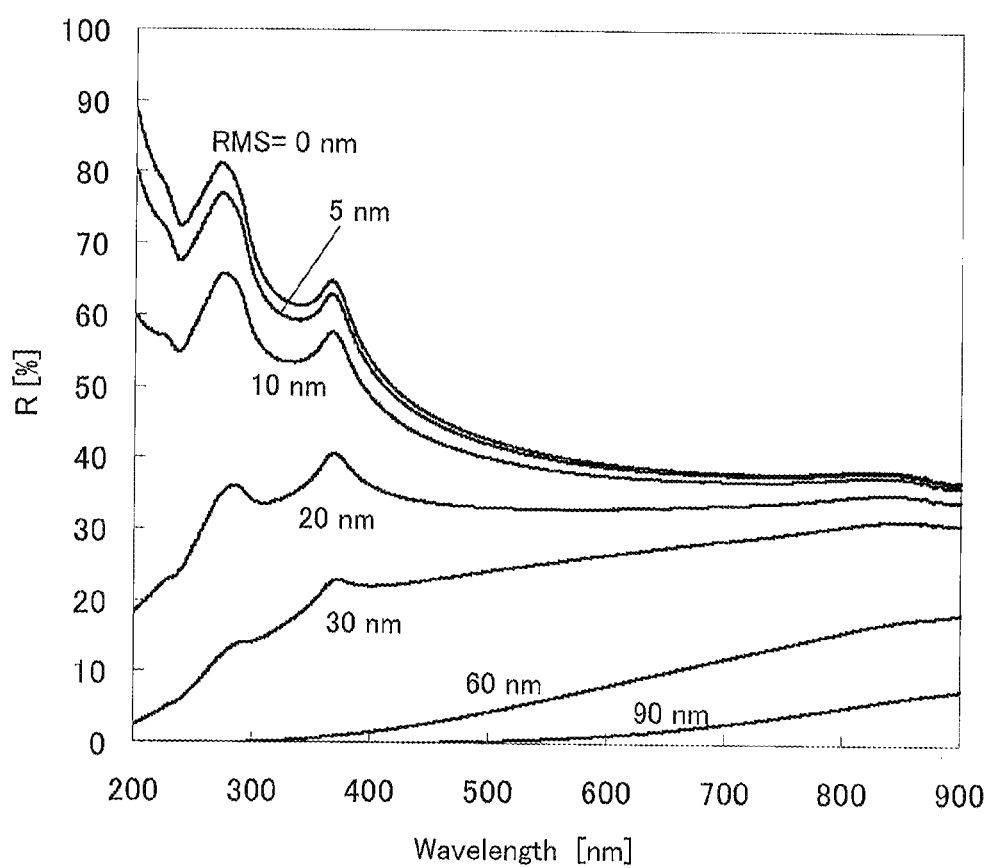

FIG. 16 is a graph showing reflectance with respect to each surface roughness of an antireflective structure of the present invention.

DESCRIPTION OF EMBODIMENTS

[First Embodiment]

The following explains one embodiment of the present invention with reference to FIGS. 1 to 6.

The wordings "mainly including", "mainly containing" and "mainly made of" in the present specification indicate that the component occupies the largest part of whole components, the component preferably occupies 50 wt % or more of the whole components, and the component most preferably occupies 100 wt % of the whole components. The wording "A to B" indicative of a range indicates being not less than A and not more than B.

(a) Structure of Antireflective Structure 10

Figure 1:
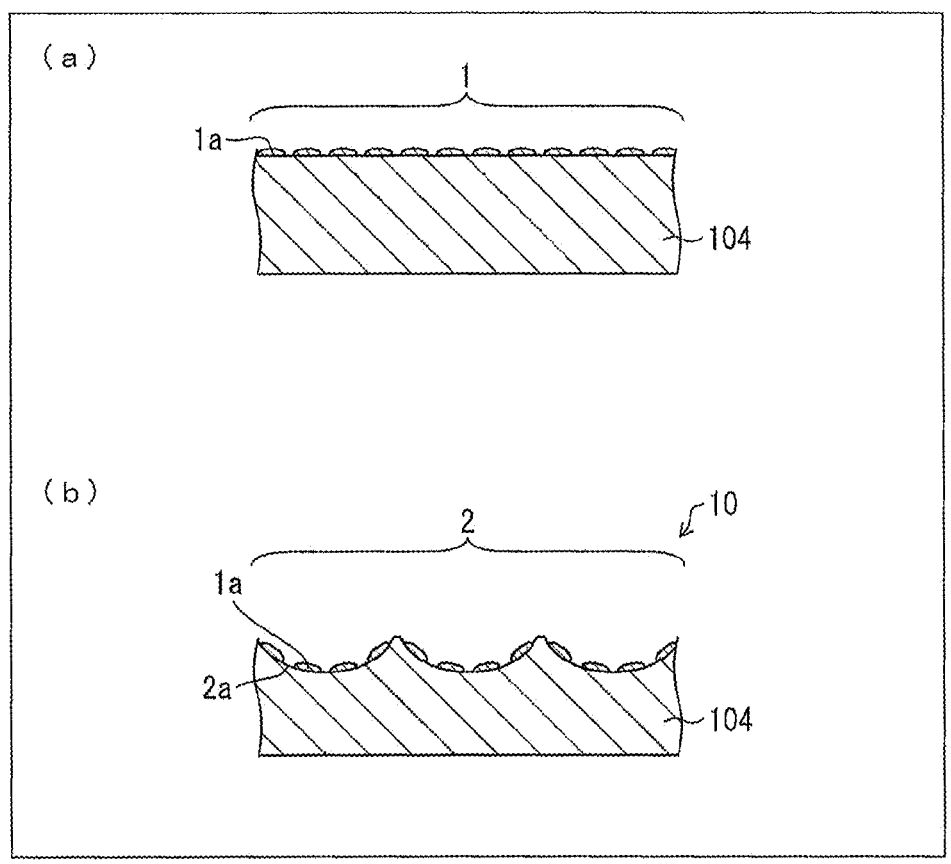
Figure 2:
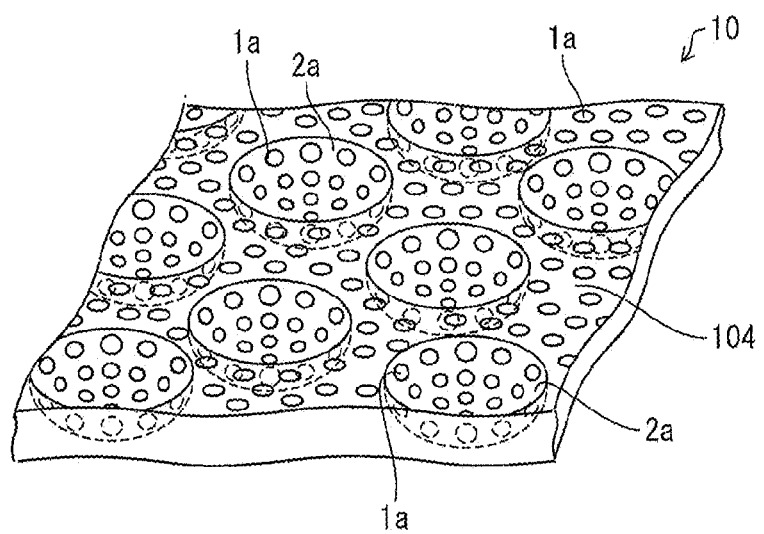
FIG. 2 is a perspective view schematically showing a structure of the antireflective structure.

Initially, the structure of an antireflective structure 10 of the present invention is explained schematically. (a) of FIG. 1 is a cross sectional view schematically showing a structure of an antireflective structure at its initial stage of production. (b) of FIG. 1 is a cross sectional view schematically showing a cross section of the antireflective structure 10. FIG. 2 is a perspective view schematically showing the structure of the antireflective structure 10. The structure of the antireflective structure 10 shown in FIG. 2 is extremely deformed in order to facilitate the reader understanding the structure. As for actual structure, the reader is requested to refer to (a) and (b) of FIG. 10 etc. which will be mentioned later.

As shown in (b) of FIG. 1 and FIG. 2, the antireflective structure 10 prevents reflection of light. The antireflective structure 10 is designed such that a plurality of concavities 2a (large concavities) each having a plurality of convexities 1a (small convexities) thereon are formed on the surface of a base substance 104. The plurality of convexities 1a constitute a first convex structure 1, and the plurality of concavities 2a constitute a second concave structure 2.

The plurality of concavities 2a are not necessarily required to be densely formed on the surface of the base substance 104. That is, the surface of the base substance 104 may have a portion where the concavities 2a are not formed and only the convexities 1a are formed. However, in order to enhance an antireflective effect, it is preferable that the concavities 2a are densely formed on the surface of the base substance 104.

The base substance 104 may be an optical element on which an antireflective structure is to be formed, or may be a transfer master for transferring an antireflective structure onto the surface of an optical element. In a case where the base substance 104 is a part of an optical element, the antireflective structure 10 is the optical element itself. However, the antireflective structure 10 and an optical element may be formed separately.

The pitch between the plurality of convexities 1a (distance between peaks of the convexities) and the pitch between the concavities 2a (distance between centers of the concavities) are smaller than the wavelength of light incident to the antireflective structure 10 (or the wavelength of light emitted from the antireflective structure 10). It naturally follows that the width (bore diameter) of the concavity 2a is larger than the width of the convexity 1a (width in a direction along the surface of the base substance 104) and is smaller than the wavelength of the light.

The average pitch between the concavities 2a is, for example, 1.2 times to 10 times larger than the average pitch between the convexities 1a. The average pitch between the convexities 1a is, for example, not less than 7 nm and not more than 40 nm. The average pitch between the concavities 2a is not less than 28 nm and not more than 250 nm. This will be detailed later.

Furthermore, as detailed later, a structure formed by transferring an antireflective structure including the convexities 1a and the concavities 2a to other base substance is also encompassed in the technical scope of the present invention.

The plurality of concavities 2a exist on the surface of the base substance 104 with a pitch smaller than the wavelength of incident light, so that large concavities and convexities smaller than the wavelength of incident light are provided. The large concavities and convexities serve as a moth-eye structure.

Furthermore, the plurality of convexities 1a exist on the surface of the base substance 104 with a pitch smaller than the wavelength of incident light, so that small concavities and convexities smaller than the wavelength of incident light are provided. The small concavities and convexities serve as a moth-eye structure, too.

That is, the antireflective structure 10 includes a moth-eye structure made of the first convex structure 1 and a moth-eye structure made of the second concave structure 2.

Therefore, the antireflective structure 10 can yield a higher antireflective effect than a conventional configuration having a single moth-eye structure.

The invention described in Patent Literature 3 has a structure larger than the wavelength of incident light (macro structure) and a small structure smaller than the wavelength of incident light (micro structure). It should be noted that the macro structure does not correspond to the second concave structure 2, because the pitch between the concavities 2a is smaller than the wavelength of light incident to the antireflective structure 10, whereas the size of the macro structure is larger than the wavelength of incident light. Therefore, the invention described in Patent Literature 3 is essentially different from the present invention.

It should be noted that a technical idea of forming a first small moth-eye structure on the surface of a second large moth-eye structure is not disclosed in any of the aforementioned Patent Literatures and so is novel.

In general, a larger aspect ratio of convexities and concavities (height of a convex and concave structure/width of a concavity (or convexity)) provides a higher antireflective effect. Since the antireflective structure 10 can yield a higher antireflective effect than a conventional antireflective structure, the antireflective structure 10 can reduce the vertical interval of a convex and concave structure (i.e. depth of the concavities 2a) when forming an antireflective structure yielding the same antireflective effect as a conventional antireflective structure.

As mentioned later, the first convex structure 1 and the second concave structure 2 can be consecutively formed by successively carrying out substantially a single process. Accordingly, the antireflective structure 10 can be produced by an extremely simple process.

(b) Antireflective Structure Production Device

Figure 3:
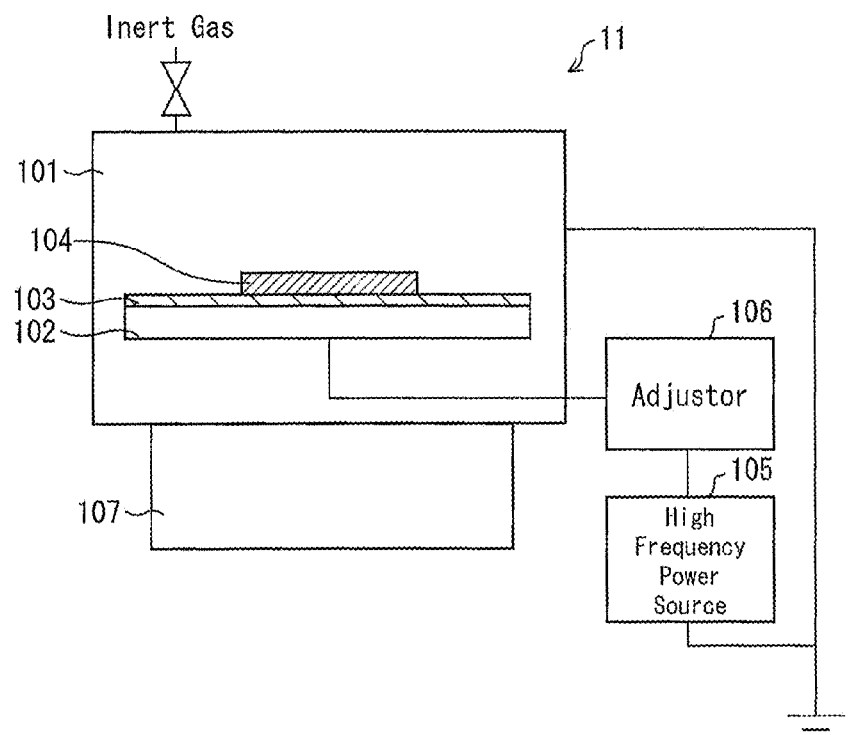
FIG. 3 is a view schematically showing a configuration of an antireflective structure production device in accordance with an embodiment of the present invention.

FIG. 3 schematically shows a configuration of an antireflective structure production device 11 in accordance with the present embodiment.

As shown in FIG. 3, the antireflective structure production device 11 includes a vacuum chamber 101, a base substance supporter 102 for supporting the base substance 104, a supply source 103 for supplying a supply material to the base substance 104, a high frequency power source 105, an adjustor 106, and a vacuum pump 107. The antireflective structure production device 11 subjects the base substance 104 to sputter-etching, and at the same time supplies the supply material from the supply source 103 to the base substance 104, so that the antireflective structure 10 having the first convex structure 1 and the second concave structure 2 is formed on the surface of the base substance 104.

(Vacuum Chamber 101)

In the antireflective structure forming device 11, the base substance 104, the base substance supporter 102, and the supply source 103 are provided in the vacuum chamber 101. The vacuum chamber 101 is connected with the vacuum pump 107 which can reduce the pressure inside the vacuum chamber 101.

Further, the vacuum chamber 101 is connected with a gas pipe for introducing inert gas such as Ar, Kr, and Xe into the vacuum chamber 101.

In the antireflective structure forming device 11, by introducing the inert gas and applying a high frequency voltage, it is possible to cause plasma radiation in the vacuum chamber 101 and to form the antireflective structure 10 on the base substance 104 through sputtering.

(Base Substance Supporter 102)

In the present embodiment, the supply source 103 is provided on the surface of the base substance supporter 102, and the base substance 104 is provided on the supply source 103. Consequently, the base substance supporter 102 supports the supply source 103 and the base substance 104.

The base substance supporter 102 is electrically connected with the high frequency power source 105 and therefore is preferably made of a conductive metal material.

The base substance supporter 102 is not particularly limited as long as it can support the base substance 104. The base substance supporter 102 may support the base substance 104 by fixing it with a screw or a spring, by fixing with a magnet, or performing vacuum suction.

The base substance supporter 102 does not necessarily fix the base substance 104 actively. Instead, the base substance 104 may be simply put on the base substance supporter 102. Further, the base substance supporter 102 may rotate inside the vacuum chamber 101, or may be made by combining a member receiving an electric power from the high frequency power source 105 with a member for supporting the element.

That is, a portion of the base substance supporter 102 that supports the base substance 104 is electrically connected in a direct manner, or the base substance supporter 102 is electrically connected via other member in an indirect manner. For example, the base substance supporter 102 may be arranged so that it is made of a rotating member and a base and the base substance 104 is supported by the rotating member and the base receives an electric power from the high-frequency power source 105.

(Supply Source 103)

The supply source 103 supplies a supply material to the surface of the base substance 104 so as to form the antireflective structure 10. The supply material is one capable of being combined with ejected molecules or atoms of a base substance material constituting the surface of the base substance 104 (hereinafter "base substance material") to form particles, and more preferably one capable of forming particles which are compounds of the supply material and the base substance material.

That is, the supply source 103 supplies, to the surface of the base substance 104, atoms or molecules (that may be referred to as "atoms etc." hereinafter) of a supply material. The supply material in the form of atoms etc. is a material capable of forming fine particles (concavities 1a) on the surface of the base substance 104, and more preferably, capable of being combined with the material constituting the surface of the base substance 104 to produce a compound, and of forming fine particles of the compound on the surface of the base substance 104.

In order to determine whether the base substance material and the supply material are combined with each other to produce the compound or not, a phase diagram may be used for example.

That is, "a supply material capable of being combined with the material constituting the base substance material to produce a compound" in the present specification is a supply material that has a region of a compound with the material constituting the base substance material in a phase diagram showing the base substance material. The supply material is more preferably a supply material that has a region of a compound with the base substance material under fine particle forming conditions (temperature and pressure) in use in the phase diagram showing the base substance material.

The material for the supply source 103 is not particularly limited as long as the material is a supply material capable of being combined with the base substance material to produce a compound. For example, the material may be selected from materials mainly made of transition metal elements. More specifically, the material may be (i) a material mainly including at least one metal element selected from the group consisting of V, Cr, Fe, Zr, Nb, Mo, Tc, Ru, Rh, Pd, Hf, Ta, W, Re, Os, Ir and Pt that are transition metal materials with high melting points, (ii) a material mainly including an alloy including at least one selected from the group, or (iii) a material mainly including an alloy including these materials and the base substance material.

Therefore, the concavities 1a contains one of V, Cr, Fe, Zr, Nb, Mo, Tc, Ru, Rh, Pd, Hf, Ta, W, Re, Os, Ir and Pt.

The supply material is supplied with a rate so low that the supply material is not formed as a continuous film on the base substance 104 during the process. In order to realize this configuration, the supply source 103 is provided at a position where the supply material is not directly incident to the surface of the base substance 104.

"A position where the supply material is not directly incident" in the present specification may be realized as follows. That is, the base substance 104 is provided at a position to which the supply material ejected from the supply source 103 does not reach linearly, or a shield is provided between the surface of the base substance 104 and the supply source 103 for supplying the supply material in such a manner that the supply material ejected from the supply source 103 cannot linearly reach the surface of the base substance 104, as mentioned later.

The supply source 103 may be a thin film formed on the base substance supporter 102, or a bulk formed on the base substance supporter 102. Further, it is unnecessary that the supply source 103 is formed on the whole surface of the base substance supporter 102 as long as the supply source 103 is at least partially formed on a region other than a region covered by the base substance 104. In a case where the supply source 103 is a thin film, the supply source 103 is formed with such a thickness that the supply source 103 is not lost during a process of sputter etching for forming the antireflective structure 10 consisting of the first concave structure 1 and the second convex structure 2.

(Base Substance 104)

As for the material for the base substance 104 or the material constituting the surface of the base substance 104, it is desirable to select the material so that the supply material supplied from the supply source 103 has low wettability with respect to the surface of the base substance 104 and can form fine particles on the base substance 104. It is more preferable that the material for the base substance 104 can be combined with atoms etc. from the supply source 103 to form a compound. Examples of the material for the base substance 104 include semiconductor materials mainly made of elements represented by Si or Ge, and Al.

The host material for the base substance 104 is not particularly limited as long as the aforementioned materials are formed on the surface of the base substance 104. Accordingly, in addition to the above materials, the host material for the base substance 104 may be an insulating material such as $SiO_2$, $Al_2O_3$, and glass, a semiconductor material such as GaAs and GaN, various metal materials, and a resin substrate.

When determining the material for the supply source 103 and the base substance material, it is further desirable to select the materials so that the supply material supplied from the supply source 103 produces fine particles serving as the concavities 1a on the substrate 104 which fine particles have low wettability with respect to the surface of the base substance 104.

This is because when the produced fine particles of the compound have low wettability with respect to the surface of the base substance 104, fine particles (agglomeration of fine particles) are periodically formed with a space between adjacent fine particles, thereby isolating individual fine particles. This allows forming the first concave structure 1 with high periodicity on the surface of the base substance 104, resulting production of the second convex structure 2, finally providing the antireflective structure 10 with satisfactory antireflective property.

The first concave structure 1 with high periodicity indicates that the interval for forming the concavities 1a (pitch between a plurality of concavities 1a) is within a predetermined range. Furthermore, the second convex structure 2 with high periodicity indicates that the distance for forming the convexities 2a (pitch between a plurality of convexities 2a) is within a predetermined range.

As described above, in order that the fine particles formed on the base substance 104 have low wettability with respect to the surface of the base substance 104, it is important to design that surface energy at the side of the base substance 104 is small and surface energy at the side of the fine particles and interface energy between the base substance 104 and the fine particles are large. Therefore, it is desirable to design that the material for the supply source 103 is a material having large surface energy and the material for the base substance material is a material having surface energy smaller than that of the material having large surface energy.

It is known that the magnitude of surface energy generally has a relationship with a melting point of a material (element) and therefore it is particularly desirable to design that the material (element) for the supply source 103 is a high-melting-point material whose melting point generally exceeds 1500° C. Furthermore, it is desirable that the base substance material is a material having a lower melting point than the material for the supply source 103.

Further, when the base substance material and the supply material are selected so that the supply material supplied from the supply source 103 is combined with the base substance material on the base substance 104 to produce fine particles of a compound on the substrate 104 (when the melting point of the base substance material is lower than the melting point of the supply material), it is possible to lower the melting point of the resulting fine particles than fine particles formed when the supply material is not combined with the base substance material to produce a compound. This allows making the fine particles formed on the base substance 104 unfamiliar with the surface of the base substance 104 and causing the fine particles to grow to such an extent that the fine particles can be used as the concavities 1a necessary for formation of the antireflective structure 10.

Specifically, assume that the supply material is, for example, a material with a high melting point that forms extremely small particles of 1 to 2 nm or less on the base substrate 104 in a case where the base substance material is a material that cannot be combined with the supply material to produce a compound. Here, by designing that the base substance material is a material that can be combined with the supply material to produce a compound, the melting point of the resulting fine particles (compound) gets lower than the melting point of the supply material, allowing the fine particles to grow to have a diameter of 4 nm to several ten nm on the base substance 104.

(High Frequency Power Source 105 and Adjustor 106)

The high frequency power source 105 applies a high frequency voltage varying positively and negatively with respect to a ground voltage on at least one of the base substance 104 and the base substance supporter 102. The high frequency power source 105 is electrically connected with the base substance supporter 102 via the adjustor 106 for regulating impedance.

The high frequency power source 105 is a power source that generates a high-frequency voltage with a frequency range that allows ejecting the supply material from the supply source 103 through sputtering, specifically, a frequency range not less than 100 kHz and not more than 100 MHz, and that can supply a high-frequency voltage varying positively and negatively with respect to a ground voltage. For example, there may be used a power source for generating a high-frequency voltage with 13.56 MHz or so that is general as a power source for high frequency sputtering.

Figure 4:
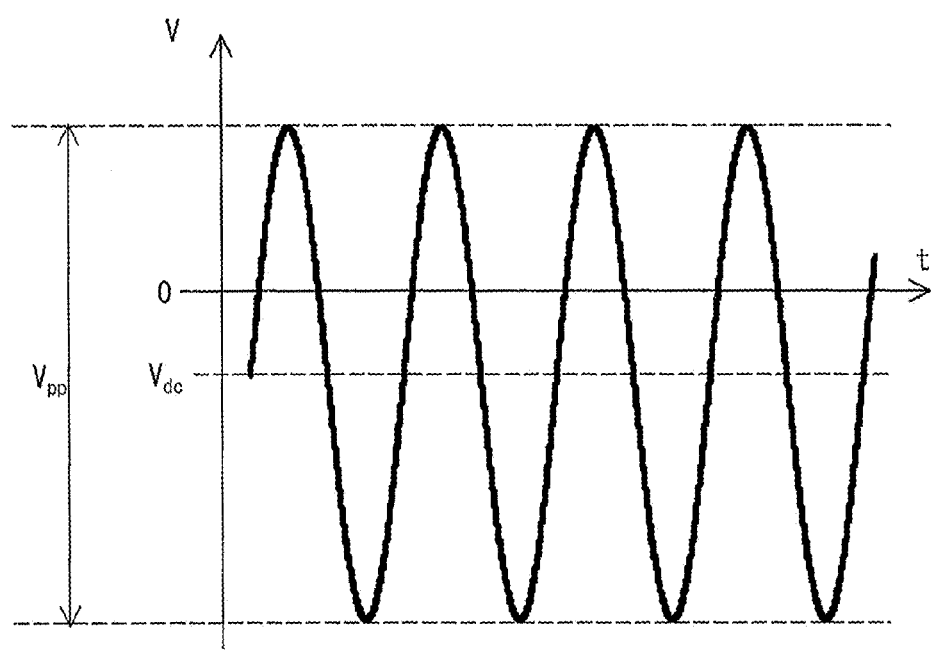
FIG. 4 is a view showing an example of a waveform of a high frequency voltage which varies both positively and negatively.

FIG. 4 illustrates an example of a waveform of the high-frequency voltage varying positively and negatively with respect to a ground voltage.

As illustrated in FIG. 4, the high-frequency voltage generated by the high-frequency power source 105 has substantially the shape of a sine wave, and varies positively and negatively with respect to a ground voltage (line 0 in FIG. 4).

Here, assume that a difference between the maximum value and the minimum value of the high-frequency voltage is Vpp and a value obtained by subtracting the ground voltage from an average value of the high-frequency voltage is Vdc. In order that the high-frequency voltage varies both positively and negatively with respect to the ground voltage, it is necessary to set Vpp to be larger than the absolute value of Vdc.

As shown in FIG. 4, Vdc is applied in a negative direction, in other words, in a direction that allows sputter-etching the surface of the base substance 104.

(Vacuum Pump 107)

The vacuum pump 107 is not particularly limited as long as it can reduce the pressure inside the vacuum chamber 101. For example, the vacuum pump 107 may be obtained by combining a rotary pump or a dry pump with a pump selected from a turbo molecular pump, a cryopump, and a diffusion pump.

In FIG. 3, the side of the high-frequency power source 105 which side is opposite to the side of the base substance supporter 102 is in a ground state, and the high-frequency power source 105 has the same potential as that of the side wall of the vacuum chamber 101. However, the arrangement of the high-frequency power source 105 is not limited to this as long as it can apply a high-frequency voltage on the base substance supporter 102. Specifically, it may be arranged so that a counter electrode is provided in the vacuum chamber 101 and the counter electrode has the same potential as that of the side of the high-frequency power source 105 which side is opposite to the side of the base substance supporter 102.

Furthermore, the antireflective structure producing device of the present application may include a sputtering device capable of carrying out a sputter-etching process.

(c) Method for Producing Antireflective Structure

The following explains a method for producing the antireflective structure 10.

<1. Formation of Vacuum State and Introduction of Inert Gas>

Initially, vacuuming of the vacuum chamber 101 is performed by the vacuum pump 107, and the pressure of the vacuum chamber 101 is reduced. Here, the ultimate vacuum is not particularly limited. In terms of reducing the influence of contamination, the ultimate vacuum is set to $1 \times 10^{-3}$ Pa or less, more preferably $1 \times 10^{-4}$ Pa or less, for example. Next, inert gas is introduced from a gas pipe. Here, the pressure (gas pressure) in the vacuum chamber 101 is set to approximately $1 \times 10^{-2}$ Pa to 1 Pa for example.

<2. Formation of First Concave Structure 1>

Subsequently, the high-frequency power source 105 is electrified and a high-frequency voltage is applied on the base substance supporter 102. Here, since the inert gas has been introduced into the vacuum chamber 101, plasma radiation occurs, which causes sputtering.

Here, the difference (Vpp) between the maximum value and the minimum value of the high-frequency voltage is set to 200V to 2000V for example. The value (Vdc) obtained by subtracting a ground voltage from the average value of the high-frequency voltage is set to −500V to 0V for example. The relation between Vpp and Vdc is set so that Vpp is larger than the absolute value of Vdc.

Consequently, the high-frequency voltage varies positively and negatively with respect to the ground voltage. The introduction of the inert gas and the application of the high-frequency voltage may be performed in reverse order. By setting Vdc to be negative, the process as a whole becomes sputtering (sputter-etching) performed in a direction for etching the surface of the base substance 104.

The magnitude of the high-frequency voltage may be controlled by an electric power radiated to the base substance supporter 102 and an electric power reflected by the base substance supporter 102. The radiated electric power is set so that a radiated electric power per unit area that is obtained by dividing the radiated electric power by the area of the surface of the base substance supporter 102 on which surface the base substance 104 is attached ranges approximately from 0.02 W/cm² to 1.2 W/cm² for example. The reflected electric power is preferably as small as possible. For example, the reflected electric power is set to be approximately 10% or less of the radiated electric power.

During a time when a voltage negative with respect to the ground voltage is applied on the base substance supporter 102, the inert gas ions in the vacuum chamber 101 are given kinetic energy in a direction in which the ions collide with the base substance supporter 102. Consequently, the inert gas ions collide with the surface of the supply source 103 and the surface of the base substance 104 and make etching thereof in which atoms etc. on the surfaces thereof are ejected physically.

That is, the surface of the base substance 104 is etched so as to eject molecules or atoms of the base substance material constituting the base substance 104, and the supply material capable of being combined with the base substance material to form particles is supplied from the supply source 103 (supply step).

On the other hand, during a time when a voltage positive with respect to the ground voltage is applied on the base substance supporter 102, the inert gas ions in the vacuum chamber 101 are given kinetic energy in a direction in which the ions go away from the base substance supporter 102. Consequently, atoms etc. ejected from the supply source 103 and the base substance 104 are attached to the surface of the base substance 104. In addition, during the time when a voltage negative with respect to the ground voltage is applied on the base substance supporter 102, atoms etc. of the supply source 103 and on the surface of the base substance 104 cause splash phenomenon in which atoms etc. are physically ejected to splash around. This also causes the atoms etc. to attach to the surface of the base substance 104.

That is, the base substance material ejected in the supply step and the supply material supplied in that step are combined with each other to form a plurality of concavities 1a on the surface of the base substance 104 (concavity formation step). At that time, the concavities 1a are formed with a pitch smaller than the wavelength of light incident to the antireflective structure 10.

Thus, the ejection of atoms etc. from the supply source 103 and the surface of the base substance 104 and the attachment of atoms etc. to the surface of the base substance 104 are repeated, so that atoms etc. supplied from the supply source 103 and atoms etc. ejected from the base substance 104 are combined with each other to grow as particles. Here, when the supply material supplied from the supply source 103 is a material having a higher melting point than that of the material constituting the surface of the base substance 104, particles having grown on the base substance 104 show low wettability with respect to the surface of the base substance 104, and consequently there is formed the first concave structure 1 obtained by periodically forming the concavities 1a while providing a space between adjacent fine particles. A time for the first concave structure 1 to be formed is not particularly limited, and may range approximately from 100 seconds to 1 hour for example.

<3. Formation of Second Concave Structure 2>

After formation of the first convex structure 1, a high frequency voltage similar to one used in the formation of the first convex structure 1 continues to be applied to cause sputtering, so that the supply material continues to be supplied to the surface of the base substance 104 and a sputter-etching process is carried out. Thus, the second concave structure 2 is formed on the surface of the base substance 104 as a result of the presence of the first concave structure 1 on the base substance 104.

That is, the supply step and the convexity formation step are repeated continuously so that a plurality of the concavities 2a each having the convexities 1a thereon are formed on the surface of the base substance 104 with a pitch smaller than the wavelength of incident light.

(d) Average Cycle of First Convex Structure 1

The size of the convexities 1a in a direction along the surface of the base substance 104 is controllable depending on the supply material, the material for the surface of the base substance 104, and the condition under which a high frequency voltage is applied, and is designed such that, for example, the particle size of fine particles constituting the convexities 1*a* ranges from 4 nm to 20 nm and the average cycle (average pitch) ranges from approximately 7 nm to 40 nm. Furthermore, the height of the convex shape ranges from approximately 2 nm to 15 nm.

Assume that light incident to the antireflective structure 10 is ultraviolet light and near-infrared light (ranging from approximately 30 nm to 2500 nm). In this case, the average cycle of the convexities 1*a* (ranging from 7 nm to 40 nm) is smaller than the wavelength of light incident to the antireflective structure 10.

(e) Average Cycle of Second Concave Structure 2

The size of the concavities 2*a* varies depending on the supply material, the material for the surface of the base substance 104, and the condition under which a high frequency voltage is applied. The second concave structure 2 is formed with an average cycle which is approximately 1.2 times to 10 times larger than that of the first convex structure 1, and the height (depth) of the concavities 2*a* is approximately 1.5 times to 20 times larger than the height of the convexities 1*a*.

For example, in a case where the first convex structure 1 is formed with an average cycle of approximately 24 nm, the second concave structure 2 can be formed with an average cycle of approximately 28 nm to 250 nm. Furthermore, in a case where the first convex structure 1 having a first cycle is formed with a height of approximately 5 nm, the second concave structure 2 can be formed with a height (depth) of approximately 7 nm to 100 nm. The presence of the second concave structure 2 enables the base substance 104 to have the antireflective structure 10 yielding a high antireflective effect particularly in the wavelength ranging from blue to ultraviolet light.

(f) Position of Supply Source 103

In the present embodiment, the supply method is not limited as long as the supply material from the supply source 103 is supplied with a rate so low that the supply material is not formed as a consecutive thin film on the base substance 104. It is more preferable to provide the supply source 103 at a position where the supply material is not directly incident to a surface of the base substance 104 on which surface the first convex structure 1 and the second concave structure 2 are formed (surface of the base substance 104 on the upper side of the paper in FIG. 1), because such a position can easily prevent the atoms of the supply material from being formed as a consecutive thin film on the base substance 104.

For example, the configuration shown in FIG. 3 is designed such that the atoms of the supply material from the supply source 103 are prevented by the base substance 104 itself from being directly incident to the surface of the base substance 104 on which surface the first convex structure 1 and the second concave structure 2 are formed.

Such a configuration is particularly desirable because such a configuration prevents a high-energy component of sputtered particles with a high energy and a large size distribution which are ejected from the supply source 103 by sputtering from being directly incident to the surface of the base substance 104 so that only particles with a low energy which have made a detour of the base substance 104 reach the surface of the base substance 104 to form fine particles with high periodicity (first convex structure 1) and the second concave structure 2 formed subsequently to the first convex structure 1.

(g) Mechanism by which Second Concave Structure 2 is Formed

Here, an explanation is made as to a mechanism by which the second concave structure 2 is formed as a result of the presence of the first convex structure 1. It is deemed that formation of the second concave structure 2 results from ripples appearing in sputter-etching.

The antireflective structure formation process in accordance with the present embodiment is a process in which negative Vdc is applied to the base substance 104, i.e. a sputter-etching process. In a case where the sputter-etching process is carried out by a device having a configuration shown in FIG. 3, a high frequency voltage is applied across the base substance supporter 102 and a wall of a chamber to generate plasma that makes sputtering, thereby etching the surface of the base substance 104.

At that time, inert gas ions fly with various incident angles to the base substance 104 and etch the base substance 104. Accordingly, in a normal sputter-etching process without the first convex structure 1, the surface of the base substance 104 is smoothed as the sputter etching proceeds.

As described above, Non-patent Literature 1 discloses ripple shapes formed on an Si-substrate when the Si-substrate is mounted within an ion beam sputtering device and the surface of the substrate is irradiated with Ar ions from a skew direction with respect to the surface of the substrate.

In the ion beam sputtering disclosed in Non-patent Literature 1, inert gas ions are radiated from an ion gun to a substrate, so that the substrate is sputtered from only one direction. According to Non-patent Literature 1, inert gas ions are incident to the substrate with a certain incident angle and the Si substrate is etched, so that ripple shapes are formed on the substrate.

In contrast thereto, in the device shown in FIG. 3 of the present application, a high frequency voltage is applied across the base substance supporter 102 and the wall of the chamber, so that sputter-etching is made by inert gas ions with various incident angles unlike Non-patent Literature 1. In this case, ripples are cancelled, and if the first convex structure 1 had not been formed, the surface of the base substance 104 would have been kept flat.

In the present application, the base substance 104 where the first convex structure 1 is formed is continuously subjected to sputter-etching (second concave structure formation step) so that an element constituting the convexities 1*a* continues to be supplied in order that the first convex structure 1 is maintained during the second concave structure 2 formation step.

In such a case, the surface of the base substance 104 is not made flat by sputter-etching, and the first convex structure 1 is maintained on the surface of the base substance 104. Portions of the base substance 104 which expose its original surface (portions where the first convex structure 1 does not exist) do not have fine particles thereon (do not receive the supply material) in sputter-etching, so that the etching proceeds more strongly and consequently the concavities 2*a* appear.

Furthermore, inert gas ions with a small incident angle are partially prevented by the convexities 1*a* of the first convex structure 1 from reaching the surface of the base substance 104 which surface is at the back of the convexities 1*a*. Consequently, it is deemed that symmetry in the sputter-etching is impaired, ripples are not cancelled, and the sputter-etching proceeds particularly at a portion with a large etching strength due to overlapping (interference) of ripples, so that the second convex structure 2 grows.

In view of the above, formation of the second concave structure 2 requires (i) thick formation of the first convex structure 1 with an interval of several ten nanometers or less, and (ii) continuous supply of the supply material to the surface of the base substance 104 during sputter-etching for forming the second concave structure 2.

In the antireflective structure 10 obtained by such sputter etching, the first convex structure 1 formed in the first step is maintained on the surface in the following second step in which the second concave structure 2 is formed.

The first convex structure 1 is not necessarily required to have a definite periodicity. The first concave structure 1 is only required to be formed thickly with a distance of approximately several nanometers to several ten nanometers. However, in terms of formation of the second concave structure 2 with a more uniform shape and a more uniform cycle, it is particularly desirable to design the first convex structure 1 to have a high periodicity.

(h) Advantages of the Present Invention

In the process for forming the antireflective structure 10, the first convex structure 1 is formed initially and then the second concave structure 2 is formed, thereby forming the antireflective structure 10. Since the process continuously carries out substantially a single process, the process enables continuously forming the first convex structure 1 and the second concave structure 2.

Therefore, unlike a conventional antireflective structure production process, the process of the present invention can produce the antireflective structure 10 by a single process. Furthermore, since the process of the present invention can produce the antireflective structure 10 only by a dry process in a vacuum device, it is possible to produce the antireflective structure 10 while preventing contamination of the base substance 104 and without deteriorating properties of the base substance 104.

Furthermore, in a case where the surface of the base substance 104 is made of a material such as Si and Ge which has relatively low surface energy and which forms a compound with a transition metal with a high melting point, it is possible to directly form the antireflective structure 10 on the base substance 104 without any special treatment on the base substance 104. Therefore, such a material is particularly preferable for directly forming the antireflective structure 10 on an optical element made of such a material.

Furthermore, it is possible to form the antireflective structure 10 on the surface of the base substance 104 made of a low-melting-point material such as plastic, because the process for forming the antireflective structure 10 does not require heating of the base substance 104 and can be carried out a room temperature. Furthermore, since the gas to be supplied is inert gas, there is no possibility that the gas reacts with the base substance 104 and deteriorates the base substance 104.

Furthermore, since the antireflective structure 10 is formed by sputter-etching, it is possible to form the antireflective structure 10 even when the surface of the base substance 104 is curved.

(i) Difference from the Invention Described in Patent Literature 4

Patent Literature 4 mentioned above discloses a process for forming fine particles corresponding to the convexities 1a. The present invention is obtained by modifying the method disclosed in Patent Literature 4 to extend a time for the step of forming fine particles (fine particle formation step) or to increase a high frequency voltage to be applied on the base substance supporter 102 in forming fine particles, thereby further forming the concavities 2a.

Extending the time for the fine particle formation step leads to extending a time for a production process and so is generally considered as undesirable. Accordingly, so far, there has not been made any attempt to extend the time for the fine particle formation step. Therefore, it would have been difficult for a person skilled in the art to find that extension of the time for the fine particle formation step enables formation of the concavities 2a.

Furthermore, since increasing a high frequency voltage to be applied on the base substance supporter 102 increases production costs, it is desirable to form the convexities 1a with as small power consumption as possible. Accordingly, so far, there has not been made any attempt to apply a voltage larger than a range of a voltage found to be sufficient to form the convexities 1a. Therefore, it would have been difficult for a person skilled in the art to find that increasing a voltage to be applied in the fine particle formation step enables formation of the concavities 2a.

The present invention was made by breaking such conventional ideas and extending the time for the step of forming the convexities 1a or increasing the voltage to be applied in the step of forming the concavities 1a. Accordingly, a person skilled in the art could not have easily arrived at the present invention based on Patent Literature 4.

(j) Modification Examples

In the present embodiment, the base substance 104 and the base substance supporter 102 may be electrically connected with each other or may be not electrically connected with each other. Even when they are not electrically connected with each other, since the base substance supporter 102 exists very close to the base substance 104, ions having been given kinetic energy toward the base substance supporter 102 also reach the base substance 104. This yields the same effect as when the base substance 104 and the base substance supporter 102 are electrically connected with each other.

Specifically, for example, in a case where the base substance 104 is one obtained by forming on the surface of a non-conductive base material a material capable of being combined with atoms etc. supplied from the supply source 103 to produce a compound, it is possible to obtain the first convex structure 1 with high periodicity. Further, the high-frequency voltage may be directly applied on the base substance 104 without being applied on the base substance supporter 102.

In the present embodiment, it is desirable to meet conditions (i)-(iii) in order to obtain the first convex structure 1 and the second concave structure 2. These conditions are as follows: (i) the material constituting the supply source 103 (the supply material supplied from the supply source 103) can form fine particles on the surface of the base substance 104, in other words, the supply material is combined with the base substance material with low wettability, and more desirably, the supply material can be combined with the base substance material to produce a compound, (ii) a high-frequency voltage is applied on the base substance 104, and particularly desirably (iii) the base substance 104 and the supply source 103 are positioned such that atoms etc. from the supply source 103 are not directly incident to the base substance 104.

Therefore, the device in the present embodiment is not necessarily limited to the device in FIG. 3 as long as the device is designed to meet the above conditions (i) and (ii), and more desirably conditions (i) to (iii).

Figure 5:
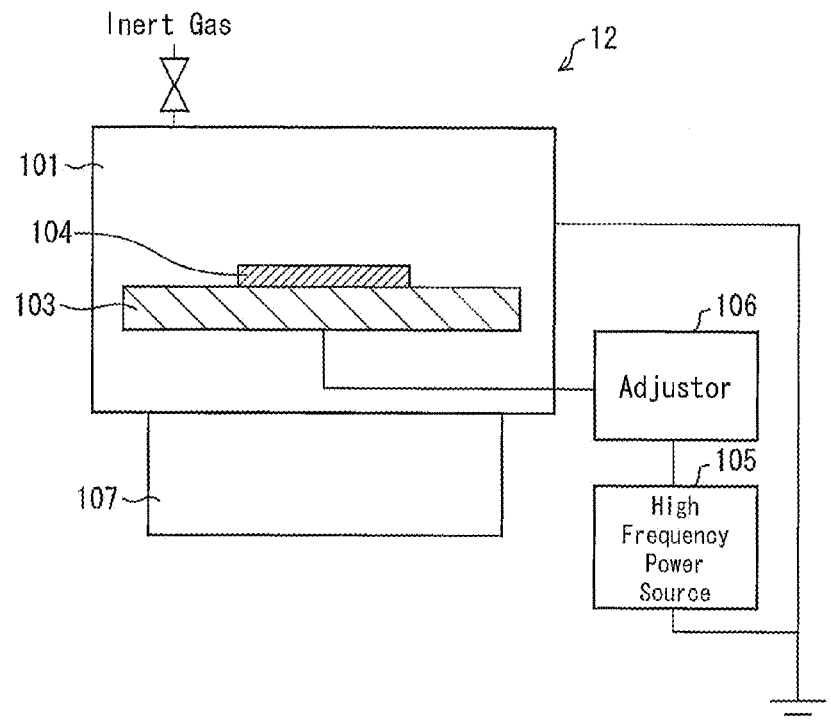
FIG. 5 is a view schematically showing a modification example of the antireflective structure production device.
Figure 6:
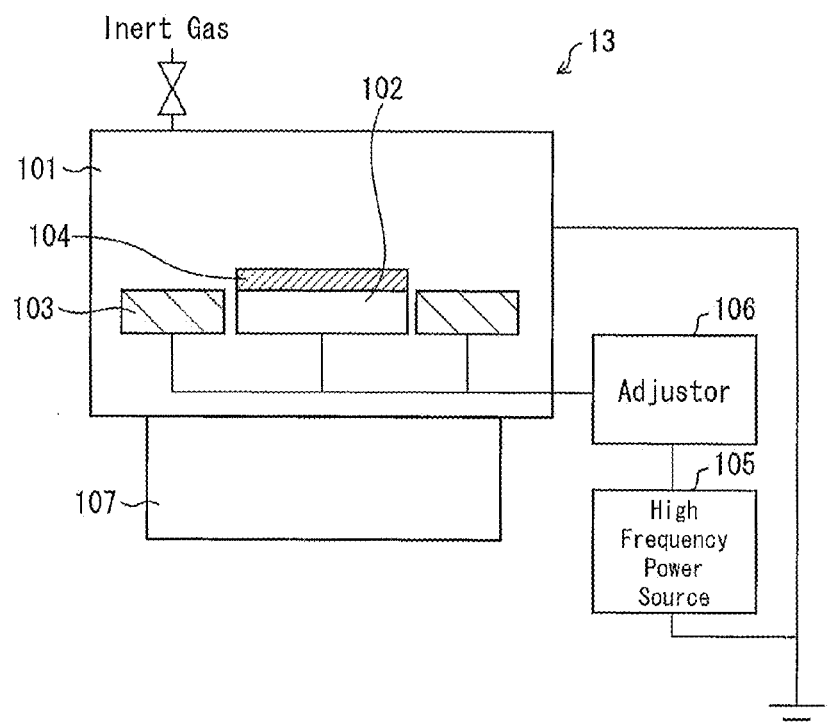
FIG. 6 is a view schematically showing another modification example of the antireflective structure production device.

For example, as in an antireflective structure production device 12 in FIG. 5, the base substance supporter 102 itself may serve as a supply source. In other words, the supply source 103 may serve as a base substance supporter. Alternatively, as in an antireflective structure production device 13 in FIG. 6, the supply source 103 may be positioned adjacently to the base substance supporter 102 to be separate from the base substance supporter 102. FIGS. 5 and 6 are views schematically showing modification examples of the antireflective structure production device.

Alternatively, in the arrangement in FIG. 6, a power source for supplying a voltage (electric power) to the supply source 103 and a power source for supplying a voltage (electric power) to the base substance 104 may be provided separately. In this case, the power source for supplying a voltage (electric power) to the supply source 103 may be a direct current power source instead of a high-frequency power source. Further, in the arrangements in FIGS. 3, 5, and 6, application of a high-frequency voltage on the base substance supporter 102 may be performed by applying the voltage on the base substance 104.

In the configuration shown in FIG. 6, instead of the high-frequency power source 105 for supplying a voltage to the supply source 103, there may be provided an ion source or an electron source for radiating ion beam or electron beam to the supply source 103 so as to cause the supply source 103 to supply atoms etc. Alternatively, there may be provided a heating source for heating the supply source 103 so as to evaporate molecules.

Furthermore, even if the supply source 103 is positioned ahead of the surface of the base substance 104 (upper direction in FIGS. 3, 5, and 6), by positioning the supply source 103 and the base substance 104 so that no potential difference that causes sputtering exists between the supply source 103 and the base substance 104 in applying a high-frequency voltage, it is possible to meet the condition (iii) that the base substance 104 and the supply source 103 are positioned such that atoms etc. from the supply source 103 are not directly incident to the base substance 104, allowing more desirable formation of the first convex structure 1 and the second concave structure 2.

[Second Embodiment]

Figure 7:
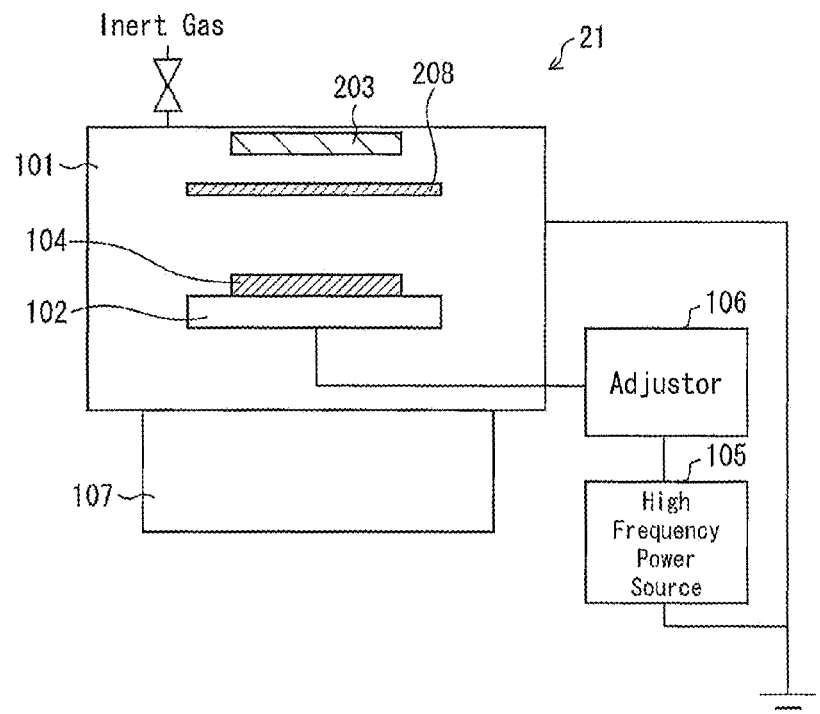
FIG. 7 is a view schematically showing a configuration of an antireflective structure production device in accordance with another embodiment of the present invention.

The following explains another embodiment of the present invention with reference to FIG. 7. The structure that is not explained in the present embodiment is the same as that of First Embodiment unless otherwise stated. For convenience of explanation, members having the same functions as those illustrated in the drawings of First Embodiment are given the same reference numerals and explanations thereof are omitted here.

FIG. 7 is a cross sectional drawing schematically illustrating a configuration of an antireflective structure production device 21 in accordance with the present embodiment. As illustrated in FIG. 7, the antireflective structure production device 21 employed in the present embodiment includes a vacuum chamber 101, a base substance supporter 102 provided inside the vacuum chamber 101, a base substance 104 attached to the base substance supporter 102, a high-frequency power source 105 for applying a high-frequency voltage on the base substance supporter 102, an adjustor 106 for adjusting impedance, and a vacuum pump 107 for vacuuming the vacuum chamber 101, as in the antireflective structure production device 11 explained in First Embodiment.

(a) Supply Source 203

In the present embodiment, a supply source 203 for supplying atoms etc. to the base substance 104 is provided as a target material for sputtering, and is connected with a sputtering power source that is common to the high-frequency power source 105 for applying a high-frequency voltage on the base substance supporter 102 or that is different from the high-frequency power source 105, and atoms etc. are ejected from the supply source 203 by sputtering.

The material constituting the supply source 203 is the same as the material constituting the supply source 103.

(b) Blocking Member 208

Besides, in the present embodiment, a blocking member 208 for preventing the atoms etc. from the supply source 203 from being directly incident to the base substance 104 is provided on a line connecting the supply source 203 and the base substance 104.

The material constituting the blocking member 208 is not particularly limited as long as it can block atoms etc. supplied from the supply source 203. The material is preferably a material resistant to damage caused by sputtering. Examples of the material include stainless steel, aluminum, aluminum alloy, and glass.

Further, in order that the blocking member 208 is not sputtered and the material constituting the blocking member 208 does not attach to the base substance 104, it is further preferable that the blocking member 208 has a ground voltage or has the same potential as that of the base substance supporter 102.

By providing the blocking member 208 as above, atoms etc. ejected from the supply source 203 cannot linearly and directly reach the base substance 104. Instead, the atoms collide with inert gas in film formation atmosphere or other atoms etc. ejected from the supply source 203 and are scattered to reach the surface of the base substance 104, or collide with the blocking member 208 and scattered or diffracted to have low energy and reach the surface of the base substance 104.

(c) Step for Forming Antireflective Structure 10

Similarly with First Embodiment, the ejection of atoms etc. from the surface of the base substance 104 and the attachment of atoms etc. to the surface of the substrate 104 due to application of a high frequency voltage on the base substance supporter 102 are repeated, so that fine particles including atoms etc. supplied from the supply source 203 are formed to grow on the surface of the base substance 104 as particles and become the first convex structure 1.

At that time, in a case where the supply material from the supply source 203 is one with a higher melting point than the material constituting the surface of the base substance 104, particles growing on the base substance 104 exhibits low wettability with respect to the surface of the base substance 104, so that isolated fine particles with periodicity are formed on the base substance 104 while forming a gap between individual particles. Thus, it is possible to form the first convex structure 1 with high periodicity in the order of nanometers.

Furthermore, a high frequency voltage continues to be applied to cause sputtering as in the case of forming the first convex structure 1, so that sputter-etching is carried out while the supply material continues to be supplied to the surface of the base substance 104. Thus, the second concave structure 2 resulting from the presence of the first convex structure 1 on the base substance 104 is formed on the surface of the base substance 104.

(d) Set Values of Power and Voltage

In the present embodiment, the sputtering electric power to be supplied to the supply source 203 is set to approximately 0.2 W/cm$^2$ to 8.2 W/cm$^2$ per unit area for example. This indicates that when a sputtering target of the supply source 203 is of 6 inches in diameter, an electric power of approximately 30 W to 1.5 kW is required.

As in First Embodiment, the difference (Vpp) between the maximum value and the minimum value of a high-frequency voltage to be applied on the base substance supporter 102 is set to 200V to 2000V for example. As in First Embodiment, a value (Vdc) obtained by subtracting a ground voltage from the average value of the high-frequency voltage is set to −500V to 0V for example. The relation between Vpp and Vdc is set so that Vpp is larger than the absolute value of Vdc.

Consequently, the high-frequency voltage varies positively and negatively with respect to the ground voltage. By setting Vdc to be negative, the process as a whole becomes sputtering (sputter-etching) performed in a direction for etching the surface of the base substance 104.

The magnitude of the high-frequency voltage may be controlled by the magnitudes of an electric power radiated to the base substance supporter 102 and an electric power reflected by the base substance supporter 102. When the magnitude of the high-frequency voltage is controlled by the radiated electric power and the reflected electric power, the radiated electric power is set so that a radiated electric power per unit area that is obtained by dividing the radiated electric power by the area of the surface of the base substance supporter 102 to which surface the base substance 104 is attached ranges approximately from 0.02 W/cm$^2$ to 1.2 W/cm$^2$, as in First Embodiment. The reflected electric power is preferably as small as possible. For example, the reflected electric power is set to be approximately 10% or less of the radiated electric power.

(e) Modification Example

In the present embodiment, it is desirable that the surface of the base substance supporter 102 is protected by a material hard to be sputtered or that the surface of the base substance supporter 102 is made of the same material as the supply source 203 as in First Embodiment. Alternatively, the base substance supporter 102 itself may be made of the same material as the supply source 203.

This can prevent the material constituting the base substance supporter 102 from being supplied as impurity to the base substance 104 due to application of a high frequency voltage. Alternatively, the base substance supporter 102 may be made substantially as small as the base substance 104 so that the material constituting the base substance supporter 102 does not reach the surface of the base substance 104.

The configuration of the present embodiment is more preferable because the blocking member 208 prevents supply atoms etc. from the supply source 203 from being directly incident to the surface of the base substance 104 on which surface the first convex structure 1 and the second concave structure 2 are to be formed (surface on the upper side of the base substance 104 in FIG. 7), i.e. the blocking member 208 prevents supply atoms etc. from linearly incident to the surface where fine particles are to be formed, thereby easily preventing the supply atoms from being formed as a consecutive thin film on the base substance 104.

Such a configuration is particularly desirable because such a configuration prevents a high-energy component of sputtered particles with a high energy and a large size distribution which are ejected from the supply source 203 by sputtering from being directly incident to the surface of the base substance 104 so that only particles with a low energy which have made a detour of the blocking member 208 reach the surface of the base substance 104 to form fine particles with high periodicity (first convex structure 1) and the second concave structure 2 formed subsequently to the first convex structure 1.

The antireflective structure production device 21 of the present embodiment may be arranged so that instead of the sputtering power source for supplying an electric power to the supply source 203, there is provided an ion source or an electron source for radiating ion beam or electron beam to the supply source 203 so as to cause the supply source 203 to supply atoms etc. Alternatively, there may be provided a heating source for heating the supply source 203 so as to evaporate molecules.

(f) Advantage of Antireflective Structure Production Device 21

When the antireflective structure production device 21 in accordance with the present embodiment is used to prepare the first convex structure 1 (fine particles) and then the second concave structure 2 on the surface of the base substance 104, it is possible to individually control the magnitude of a high frequency voltage (Vpp and Vdc) to be applied on the supply source 203 and power for sputtering to be supplied to the supply source 203, so that it is possible to more freely control the height of the antireflective structure and the periodicity of the antireflective structure.

[Third Embodiment]

Figure 8:
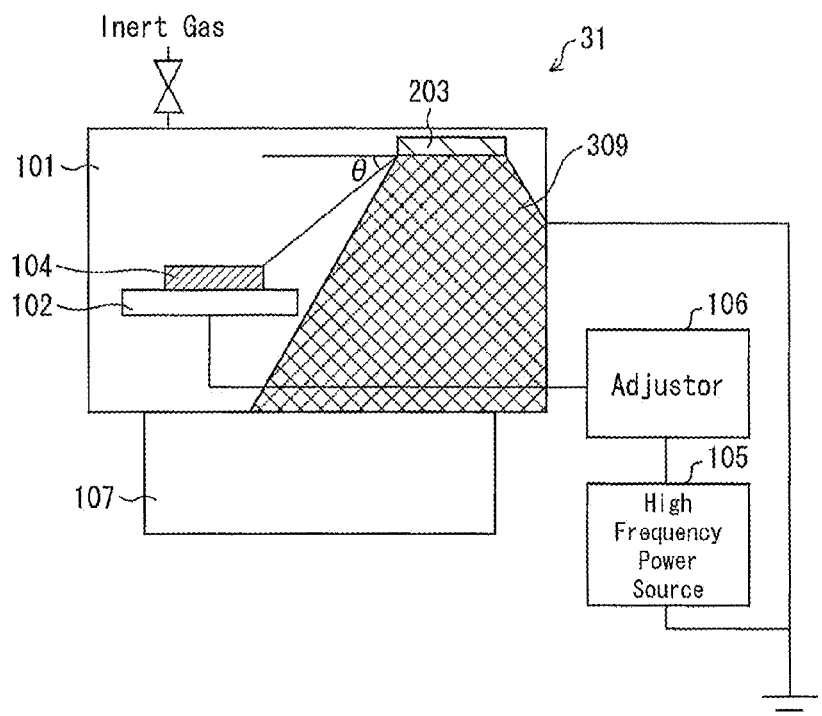
FIG. 8 is a view schematically showing a configuration of an antireflective structure production device in accordance with still another embodiment of the present invention.

The following explains further another embodiment of the present invention with reference to FIG. 8. The structure that is not explained in the present embodiment is the same as the structures of First and Second Embodiments unless otherwise stated. For convenience of explanation, members having the same functions as those illustrated in the drawings of First and Second Embodiments are given the same reference numerals and explanations thereof are omitted here.

FIG. 8 is a cross sectional drawing schematically illustrating an antireflective structure production device 31 in accordance with further another embodiment of the present invention. As illustrated in FIG. 8, the antireflective structure production device 31 includes a vacuum chamber 101, a base substance supporter 102 provided inside the vacuum chamber 101, a base substance 104 attached to the base substance supporter 102, a high-frequency power source 105 for applying a high-frequency voltage on the base substance supporter 102, an adjustor 106 for adjusting impedance, and a vacuum pump 107 for vacuuming the vacuum chamber 101, as in the antireflective structure production devices 11 and 21 explained in First and Second Embodiments, respectively.

In the antireflective structure production device 31 of the present embodiment, as with the antireflective structure production device 21 of Second Embodiment, the supply source 203 for supplying atoms etc. to the base substance 104 is provided as a target material for sputtering, and is connected with a sputtering power source that is common to the high-frequency power source 105 for applying a high-frequency voltage on the base substance supporter 102 or that is different from the high-frequency power source 105, and atoms etc. are ejected from the supply source 203 through sputtering.

(a) Position of Base Substance 104

As illustrated in FIG. 8, the antireflective structure production device 31 of the present embodiment is designed such that the base substance 104 is positioned so as to be outside of the range of a discharged plasma 309 of atoms etc. ejected from the supply source 203.

As a result of positioning the base substance 104 so as to be outside of the range of the discharged plasma 309 of the supplied atoms etc., the atoms etc. ejected from the supply source 203 do not directly and linearly reach the base substance 104. Instead, atoms etc. with low energy that have been diffused or reflected due to collision with inert gas in the film formation atmosphere, collision with other atoms etc. ejected from the supply source 203, or collision with a member in the vacuum chamber 101 such as a chamber wall, reach the surface of the substrate 104.

The range of the discharged plasma 309 can be substantially discerned by visually observing the state of discharge in sputtering the supply source 203. However, it is more preferable to confirm the range where a high periodicity can be obtained, by changing the position of the base substance 104 little by little.

Other standard for discerning the range is as follows. Assume that, as illustrated in FIG. 8, an angle θ is formed by (i) a line connecting an end of the supply source 203 which end is closest to the base substance 104 and an end of the base substance 104 which end is closest to the supply source 203 and (ii) a line extending from the surface of the supply source 203 (the surface of the supply source 203 that generates plasma and that is closer to the base substance 104). Here, by setting the angle θ to be substantially 55 degrees or less, it is possible to realize production of the antireflective structure in accordance with the present embodiment.

In many cases, a sputtering device is designed such that a target material is surrounded by a member called an earth shield. In the antireflective structure production device 31 of the present embodiment, too, when a part of the discharged plasma is blocked by the earth shield (i.e. when the base substance 104 is surrounded by the earth shield), the earth shied serves as a shielding material, so that fine particles (first convex structure 1 and second concave structure 2 resulting from first convex structure 1) with high periodicity can be obtained at an area shielded by the earth shield, as with Second Embodiment.

Therefore, in such a case, even when the angle θ is more than 55 degrees, atoms etc. ejected from the supply source 203 are not directly and linearly incident to the base substance 104. Consequently, it is possible to obtain a satisfactory antireflective structure.

(b) Supply Source 103

In the present embodiment, the supply method is not limited as long as the supply material from the supply source 103 is supplied with a rate so low that the supply material is not formed as a consecutive thin film on the base substance 104. The base substance 104 is positioned so as to be outside of the discharged plasma 309. This positioning is more preferable because this positioning prevents a supply material ejected from the supply source 203 from being directly incident to a surface of the base substance 104 where fine particles are to be formed (upper surface of the base substance 104 in FIG. 8) (prevents the supply material from being linearly incident) and is capable of easily preventing the supply atoms from being formed as a consecutive thin film on the base substance 104.

With such positioning, it is possible to prevent particles with high energy out of sputtering particles with large energy or large size distribution from directly reaching the surface of the base substance 104, so that only particles with low energy reach the surface of the base substance 104. Thus, fine particles with high periodicity (first convex structure 1) and the second concave structure 2 following the first convex structure 1 can be obtained and so is particularly preferable.

(c) Step for Forming Antireflective Structure 10

Similarly with First and Second Embodiments, the ejection of atoms etc. from the surface of the base substance 104 and the attachment of atoms etc. to the surface of the substrate 104 due to application of a high frequency voltage on the base substance supporter 102 are repeated, so that fine particles including atoms etc. supplied from the supply source 203 are formed to grow on the surface of the base substance 104 as particles and become the first convex structure 1.

At that time, in a case where the supply material from the supply source 203 is one with a higher melting point than the material constituting the surface of the base substance 104, particles growing on the base substance 104 exhibits low wettability with respect to the surface of the base substance 104, so that isolated fine particles with periodicity are formed on the base substance 104 while forming a gap between individual particles. Thus, it is possible to form the first convex structure 1 with high periodicity in the order of nanometers.

Furthermore, a high frequency voltage continues to be applied to cause sputtering as in the case of forming the first convex structure 1, so that sputter-etching is carried out while the supply material continues to be supplied to the surface of the base substance 104. Thus, the second concave structure 2 resulting from the presence of the first convex structure 1 on the base substance 104 is formed on the surface of the base substance 104.

(d) Set Values of Power and Voltage

In the present embodiment, an electric power for sputtering to be supplied to the supply source 203 is set to approximately 0.05 W/cm$^2$ to 5.5 W/cm$^2$ per unit area for example. This means that when a sputtering target of the supply source 203 is of 6 inches in diameter, an electric power of approximately 10 W to 1 kW is required.

As in First and Second Embodiments, the difference (Vpp) between the maximum value and the minimum value of a high-frequency voltage to be applied on the base substance supporter 102 is set to 200V to 2000V for example. As in First and Second Embodiments, a value (Vdc) obtained by subtracting a ground voltage from the average value of the high-frequency voltage is set to −500V to 0V for example. The relation between Vpp and Vdc is set so that Vpp is larger than the absolute value of Vdc. Consequently, the high-frequency voltage varies positively and negatively with respect to the ground voltage. By setting Vdc to be negative, the process as a whole becomes sputtering (sputter-etching) performed in a direction for etching the surface of the base substance 104.

The magnitude of the high-frequency voltage may be controlled by the magnitudes of an electric power radiated to the base substance supporter 102 and an electric power reflected by the base substance supporter 102. When the magnitude of the high-frequency voltage is controlled by the radiated electric power and the reflected electric power, the radiated electric power is set so that a radiated electric power per unit area that is obtained by dividing the radiated electric power by the area of the surface of the base substance supporter 102 to which surface the base substance 104 is attached ranges approximately from 0.02 W/cm$^2$ to 1.2 W/cm$^2$, as in First and Second Embodiments. The reflected electric power is preferably as small as possible. For example, the reflected electric power is set to be approximately 10% or less of the radiated electric power.

(e) Modification Example

In the present embodiment, an explanation was made only as to a case where the base substance 104 is positioned to be in a lateral direction from the supply source 203 in such a manner as to be out of the discharged plasma 309. Alternatively, the base substance 104 may be positioned in a direction perpendicular to the surface of the supply source 203 (a direction away from the supply source 203) in such a manner as to be out of the discharged plasma 309.

With the configuration, the supply material (atoms etc.) ejected from the supply source 203 collides with inert gas molecules such as Ar in the sputtering atmosphere and the supply material (atoms etc.) and decreases its energy as farther from the supply source 203. Accordingly, also in a case where the base substance 104 is positioned in a direction away from the supply source 203 in such a manner as to be out of the discharged plasma 309, there is yielded the same effect as in a case where the base substance 104 is positioned to be in a lateral direction from the supply source 203 in such a manner as to be out of the discharged plasma 309.

In the case where the base substance 104 is positioned in a direction away from the supply source 203 in such a manner as to be out of the discharged plasma 309, the distance between the supply source 203 and the base substance 104 is not particularly limited, but is desirably substantially two times or more longer than the mean free path of the supply material (atoms etc.) ejected from the supply source 203.

Furthermore, in the present embodiment, the base substance supporter 102 is not necessarily required to be out of the range of the discharged plasma 309 as long as at least the base substance 104 is out of the range of the discharged plasma 309.

The antireflective structure production device 31 may be arranged so that instead of the sputtering power source for supplying an electric power to the supply source 203, there is provided an ion source or an electron source for radiating ion beam or electron beam to the supply source 203 so as to cause the supply source 203 to supply atoms etc. Alternatively, there may be provided a heating source for heating the supply source 303 so as to evaporate molecules.

[Fourth Embodiment]

The following explains further another embodiment of the present invention with reference to FIGS. 1 to 9. The structure that is not explained in the present embodiment is the same as the structures of First to Third Embodiments unless otherwise stated. For convenience of explanation, members having the same functions as those illustrated in the drawings of First to Third Embodiments are given the same reference numerals and explanations thereof are omitted here.

FIG. 9 is a view schematically showing a process for producing an antireflective structure in accordance with the present embodiment. An antireflective structure 41 is produced in such a manner that a first convex structure 1 and a second concave structure 2 are formed on the surface of a base substance 104 by the production processes explained in First to Third Embodiments and thereafter structures of the first convex structure 1 and the second concave structure 2 serving as masters are transferred to a second base substance (base substance) 404 by a transfer process such as publicly known nano-imprinting and injection molding so that an antireflective structure is formed on the second base substance 404. The antireflective structure 41 is further transferred to be an antireflective structure 42.

Furthermore, if necessary, the height of a convex and concave structure on the second base substance 404 may be increased so as to yield a further larger antireflection effect.

(a) Second Base Substance 404

The second base substance 404 may be an optical element on which the antireflective structure is to be formed. The material for the second base substance 404 is not particularly limited. Examples of the material include insulating materials such as $SiO_2$, $Al_2O_3$, and glass, semiconductor materials such as Si, Ge, GaAs, and GaN, various metal materials, and resin substrates.

(b) Production Step

Next, an explanation is made as to a process for producing the antireflective structures 41 and 42. FIG. 9 is a cross sectional view showing cross sections of an antireflective structure in individual steps in the process for producing the antireflective structure in accordance with the present embodiment.

Initially, in the steps shown in (a) and (b) of FIG. 1, convexities 1a and concavities 2a are formed on the base substance 104 by the same processes as those explained in First to Third Embodiments.

Subsequently, in the step shown in (a) of FIG. 9, there is prepared the second base substance 404 one surface of which has a transfer layer 405 represented by nano-imprinting resin, and the transfer layer 405 is pressed to a surface of the base substance 104 on which surface the concave and convex structure of the base substance 104 is formed, so that the concave and convex structure of the base substance 104 is transferred to the transfer layer 405.

The transfer layer 405 used here may be resin used in a transfer technique known as a nano-imprinting technique. Examples of the transfer layer 405 include acrylic resin such as PMMA (polymethyl methacrylate), resin on which an application solution such as SOG (Spin-On-Glass) and HSQ (Hydrogen Silsequioxane) is applied, and UV curing resin.

Pressing in the transfer is performed with a pressure of approximately 0.1 MPa to 10 MPa, and if necessary, the transfer layer 405 is heated or subjected to irradiation of UV ray in order to make the transfer layer 405 softer or harder. A lubricant may be applied on the transfer layer 405 in order to facilitate detachment after the transfer (detachment of the second base substance 404 from the transfer layer 405).

The transfer layer 405 to which the shape of the concave and convex structure has been transferred is detached in combination with the second base substance 404, and then if necessary, is subjected to a slight ashing treatment in order to remove residuals that have attached in the transfer.

Next, in the step shown in (b) of FIG. 9, the second base substance 404 is subjected to anisotropic etching from a side of the second base substance 404 which side is closer to the transfer layer 405, so that a convex and concave structure corresponding to the convex and concave structure of the transfer layer 405 is formed on the second base substance 404. At that time, when the material for the transfer layer 405 is a material whose etching rate is lower than the etching rate on the second base substance 404, a difference in etching rate between the material for the transfer layer 405 and the second base substance 404 allows transferring the convex and concave structure on the second base substance 404 while enhancing the height of the convex and concave structure as shown in (c) of FIG. 9.

The anisotropic etching can be made by, for example, RIE (Reactive Ion Etching) in which plasma is generated while halogen reactive gas such as fluoride and chloride is introduced so as to perform anisotropic etching, or anisotropic wet etching.

The antireflective structure formed on the second base substance 404 as above has convexities and concavities opposite to those on the base substance 104. That is, a plurality of convexities (large convexities) 4a each having a concavities (small concavities) 3a on the surface thereof are formed on the surface of the second base substance 404 with a pitch smaller than the wavelength of incident light.

In this case, the average pitch between the plurality of convexities 4a is 1.2 times to 10 times larger than the average pitch between a plurality of concavities 3a. The average pitch between a plurality of concavities 3a is not less than 7 nm and not more than 40 nm for example, and the average pitch between the plurality of convexities 4a is not less than 28 nm and not more than 250 nm for example.

In FIG. 9, the convex and concave structure transferred on the transfer layer 405 is formed on the second base substance 404 by anisotropic etching. However, the anisotropic etching is not necessarily required. The process may be finished at the stage of the antireflective structure 40 in which the convex and concave structure has been transferred to the transfer layer 405 ((b) of FIG. 9).

The number of transfer is not limited to one, and may be plural. For example, the convex and concave structure formed on the base substance 104 ((b) of FIG. 1) may be transferred to the transfer layer 405 of the second base substance 404 and thereafter further transferred to a transfer layer of another base substance.

The convex and concave structure on the second base substance 404 shown in (c) of FIG. 9 may be transferred to a second transfer layer 407 on a third base substance (base substance) 406 which is still another base substance as shown in (d) of FIG. 9 to form the antireflective structure 42 shown in (e) of FIG. 9.

The transfer layer 405 and the second transfer layer 407 are not limited to nano-imprinting resin as long as they can transfer the convex and concave structure on the surface of the base substance 104. For example, a general photoresist material may be used, or the convex and concave structure may be transferred to the surface of the base substance 104 made of plastic by injection molding, or the convex and concave structure may be transferred onto a metal plate such as Ni by electroforming. In a case of employing the injection molding or the electroforming, the transfer layer 405 and the second base substance 404 may be formed as a single member and the second transfer layer 407 and the third base substance 406 may be formed as a single member.

As described above, use of the antireflective structure and the process for producing the antireflective structure in accordance with the present embodiment can provide an antireflective structure suitable for mass production, because the antireflective structure of the present invention can be transferred to a plurality of optical elements by using, as masters, the base substance 104 and the second base substance 404 to which the convex and concave structure of the base substance 104 has been transferred.

Enhancing the height of the convex and concave structure by using a difference in etching rate between the transfer layer 405 and the second base substance 404 and/or a difference in etching rate between the second transfer layer 407 and the third base substance 406 allows yielding a further larger antireflection effect.

In the process in accordance with the present embodiment, the step of transferring the antireflective structure and if necessary, the step of enhancing the height by anisotropic etching are added. However, since the antireflective structure formed on the base substance 104 can be produced by substantially a single process, the process in accordance with the present embodiment can be, even when including all the steps, simpler in terms of steps and devices than a conventional process for producing an antireflective structure.

EXAMPLES

The following explains the present invention in more details with reference to Examples. It should be noted that the present invention is not limited to Examples below.

<Observation by AFM (Atomic Force Microscope)>

All observations by AFM in the present Examples were made by using Nanoscope DI-3100 produced by Veeco Instruments Inc.

Example 1

Example 1 is an example in which the antireflective structure 10 including the first convex structure 1 and the second concave structure 2 was formed on the base substance 104 by using the antireflective structure production device 11 shown in FIG. 3.

(Setting Conditions)

In the present Example, the vacuum chamber 101 with the ultimate vacuum of $5 \times 10^{-5}$ Pa was used, and the base substance supporter 102 was made of stainless. On the surface of the base substance supporter 102, a Ta film with a thickness of 500 nm was formed using a sputtering device beforehand, and the Ta film was used as the supply source 103. The Ta film was formed on the whole surface of the base substance supporter 102 to which surface the base substance 104 was attached. The base substance 104 was a P-type Si wafer doped with B (plane direction (100)). The base substance 104 was fixed by a spring member onto the base substance supporter 102 on which the Ta thin film was formed.

Inert gas to be introduced into the vacuum chamber 101 in forming the antireflective structure was Ar gas. The pressure at which the gas was introduced was set to be $1.25 \times 10^{-2}$ Pa.

The high frequency power source 105 was a power source with a frequency of 13.56 MHz and capable of applying an electric power up to 1 kW. When applying a high frequency voltage from the high frequency power source 105 to the base substance supporter 102, a side of the high frequency power source 105 which side was opposite to the base substance supporter 102 was grounded electrically as shown in FIG. 3 so as to have the same potential as that of the wall of the vacuum chamber 101, and the high frequency power source 105 was controlled so that a radiated electric power was kept constant. In the present Example, a radiated electric power to be applied to a base-substance-attaching-surface of the base substance supporter 102 on which surface the base substance 104 was mounted was set to 300 W.

In the present Example, the diameter of the base-substance-attaching-surface of the base substance supporter 102 was 550 mm, and so the magnitude of a radiated electric power per unit area corresponded to 0.13 W/cm². In addition, the adjustor 106 regulated the electric power so that the reflected electric power was 5 W or less.

Consequently, while forming the antireflective structure, Vdc varied in a range of −160 V to −190 V and Vpp varied in a range of 1000 V to 1060V. This is a state where the applied high frequency voltage varied positively and negatively with respect to a ground voltage.

The time for applying a high frequency voltage in a step of forming the first convex structure 1 was set to 1200 sec. Subsequently, the time for applying a high frequency voltage in a step of forming the second concave structure 2 was set to 6000 sec. These applications of high frequency voltages were made consecutively so that these applications were included in a single process in actual operation. The distance between a surface of the base substance supporter 102 on which surface the base substance 104 was attached and a wall of the vacuum chamber 101 which wall faced that surface of the base substance supporter 102 was set to 200 mm.

(Surface Shape of Base Substance 104)

FIGS. 10 and 11 show the results of observation by AFM of the surface shapes of the base substance 104 in the antireflective structure formed by the process of the present Example. One of the surface shapes was at a stage where the first convex structure 1 was formed (application of a high frequency voltage was stopped at 1200 sec) and the other of the surface shapes was at a stage where the second concave structure 2 as well as the first convex structure 1 were formed (application of a high frequency voltage lasted 7200 sec in total).

(a) of FIG. 10 is a top view showing the result of observation of the surface with the scanning area of 1 μm square at the stage where the first convex structure 1 was formed. (b) of FIG. 10 is a top view showing the result of observation of the surface with the scanning area of 1 μm square at the stage where the second concave structure 2 as well as the first convex structure 1 were formed.

As shown in (a) of FIG. 10, the first convex structure 1 prepared in the present Example had convexities in which fine particles (convexities 1a) whose maximum vertical interval with the scanning area of 1 μm square was 5.2 nm and whose arithmetic mean roughness Ra was 0.59 nm were arranged periodically. The fine particles were observed to be isolated from each other.

Furthermore, as shown in (b) of FIG. 10, observation of the antireflective structure in which the second concave structure 2 as well as the first convex structure 1 were formed showed that fine particles constituting the first convex structure 1 were seen and the second concave structure 2 whose depth ranged from approximately 5 nm to 25 nm were formed with the maximum vertical interval was 27.9 nm and the arithmetic mean roughness Ra was 3.27 nm, indicating that formation of the second concave structure 2 increased the vertical interval and Ra.

(a) of FIG. 11 shows a view of a spectrum (2D-spectrum) obtained by two-dimensionally Fourier-transforming the result of observation by AFM of the first convex structure 1 with the scanning area of 1 μm square shown in (a) of FIG. 10 in order to confirm periodicity of the first convex structure 1 in a direction parallel to the surface of the base substance 104. (b) of FIG. 11 shows a graph of a Power Spectrum Density (PSD) obtained by two-dimensionally Fourier-transforming the result of observation of the first convex structure 1 with the scanning area of 1 μm square.

The 2D-spectrum shown in (a) of FIG. 11 indicates that a brighter portion in the view has higher intensity. A partially bright portion indicates that the portion (frequency) has a particularly stronger frequency component than that of other portions.

The result of (a) of FIG. 11 shows a ring-shaped bright portion in a frequency range corresponding to a range of 13 nm to 38 nm, which clarifies that the first convex structure 1 prepared in the present Example has strong periodicity in a very narrow range of 13 nm to 38 nm. Furthermore, since the 2D-spectrum has a ring shape, it is found that the convexities 1a are arranged isotropically in a direction parallel to the surface of the base substance 104.

On the other hand, the power spectrum density in (b) of FIG. 11 shows a clear peak in the range of 13 nm to 38 nm, and the position where the peak was highest was at 24 nm.

As described above, in the antireflective structure of the present invention, in order that the second concave structure 2 yields an antireflection effect, it is desirable that the first convex structure 1 is formed on the base substance 104 with high density in the order of several nanometers to several ten nanometers, and it is more desirable that the first convex structure 1 has strong periodicity as shown in (a) and (b) of FIG. 11.

Observation shown in (b) of FIG. 10 of the second concave structure 2 formed as a result of the presence of the first convex structure 1 showed that the length of individual concavities 2a in a direction parallel to the surface of the base substance 104 (i.e. the average pitch between the concavities 2a included in the second concave structure 2) ranges from approximately 28 nm to 250 nm, which was approximately 1.2 times to 10 times larger than the value of the center of the cycle of the first convex structure 1 (24 nm). In a case where the concavities 2a are arranged sparsely, the average pitch between the concavities 2a are longer than the length of individual concavities 2a (bore diameter of individual concavities 2a). In the present embodiment, the concavities 2a are formed densely, so that the average pitch between the concavities 2a is substantially equal to the length of individual concavities 2a.

In the present Example, a p-type Si wafer was used as the base substance 104. A n-type Si wafer yielded a similar effect. Furthermore, Si wafers with different amounts of doped elements and different plane directions yielded a similar effect. In view of the above, the base substance 104 or the material to be formed on the surface of the base substance 104 is not necessarily required to be a pure element as long as the supply material from the supply source 103 shows low wettability with respect to the surface of the base substance 104 and can form fine particles on the base substance 104.

(Elemental Analysis)

When the surface of the base substance 104 formed in the present Example was subjected to elemental analysis by Augier spectroscopy, not only Si used for the surface of the base substance 104 but also Ta used for the supply source 103 were detected. That is, it was confirmed that Ta was attached to the surface of the base substance 104 due to the steps of the present Example.

Further, the sample was subjected to Ar etching to scrape the surface of the sample, and was subjected to element analysis in a depth direction (etching amount: per 5 nm). The result of the etching showed that a little amount of Ta was detected after 5 nm etching, but Ta was not detected after 10 nm etching. This depth corresponded to the height of the fine particles observed with AFM. Consequently, it is deemed that Ta constituting the supply source 103 was included in the fine particles formed on the surface of the base substance 104.

Furthermore, it was found that on the base substance 104 on which the second concave structure 2 was formed, the first convex structure 1 remains on the base substance 104 together with the second concave structure 2. As described later in the result of later-mentioned Comparative Example 5, in order to obtain the second concave structure 2, it is important to continue to supply the supply material from the supply source 103 to the surface of the base substance 104 during the process for forming the second concave structure 2. Consequently, even after the second concave structure 2 has been formed, fine particles including the supply material exist on the surface of the base substance 104 as convexities 1a for forming the first convex structure 1.

(Image of Observation of First Convex Structure 1 with Electron Microscope)

In order to confirm in more detail the position of Ta supplied from the supply source 103 on the base substance

104, (a) of FIG. 12 shows a cross sectional image of the base substance 104 at the stage where the first convex structure 1 was formed. The image was obtained by observation with a transmission electron microscope. (b) and (c) of FIG. 12 show EDX (energy dispersive X-ray analysis) mapping images of Ta and Si corresponding to the image of (a) of FIG. 12.

In the image observed with an electron microscope shown in (a) of FIG. 12, a white and convex portion corresponds to the first convex structure 1 (fine particles). In a composition image of Ta shown in (b) of FIG. 12, a portion corresponding to the first convex structure 1 seems bright, which indicates that Ta supplied from the supply source 103 was positioned particularly selectively at the first convex structure 1.

On the other hand, a composition image of Si shown in (c) of FIG. 12 shows that Si exists on the first convex structure 1. These results show that in the first convex structure 1, Ta supplied from the supply source 103 and Si which was the material for the surface of the base substance 104 coexisted.

(Result of Measurement of Reflectance)

FIG. 13 shows the result of measurement with a spectrograph of reflectance of the base substance 104 on the surface of which the antireflective structure of the present Example was formed. FIG. 13 also shows the results of measurements of reflectance of a comparative sample which was the base substance 104 on which the antireflective structure of the present Example was not yet formed (Si wafer with a flat surface) and a reference sample which was a sample at the stage where the first convex structure 1 shown in (a) of FIG. 10 was formed.

As shown in FIG. 13, the base substance 104 on which the antireflective structure of the present Example was formed exhibited lower reflectance than the case where the antireflective structure was not formed in a wavelength range of ultraviolet light of 400 nm or less in particular (comparative sample) and the sample at the stage where the first convex structure 1 shown in (a) of FIG. 10 was formed (reference sample). This indicates that the antireflective structure of the present Example yields an antireflection effect.

(Effect of First Convex Structure 1)

In order to more clarify the effect yielded by formation of both the first convex structure 1 and the second concave structure 2 in the antireflective structure of the present Example, FIG. 14 shows the result of measurement of reflectance of the sample of the present Example and a calculated value of estimated reflectance in a case of hypothecating only the second concave structure 2 was formed.

The calculated value shown in FIG. 14 was obtained as below.

It is known that a reflectance R of a surface where an antireflective structure is formed varies depending on a surface roughness, and can be expressed by equation (1) below.

$$R = R_0 \exp\left[-\left(\frac{4\pi}{\lambda}n\sigma\right)^2\right] \quad (1)$$

In the equation (1), $R_0$ indicates a reflectance in a case of no surface roughness, $\lambda$ indicates a wavelength, n indicates a refractive index of a medium to which light is incident, and $\sigma$ indicates a standard deviation and corresponds to RMS (Root Mean Square) in a case where the average value is 0.

Here, an actual measurement of reflectance of a smooth Si wafer on which an antireflective structure was not formed was used as $R_0$ and n was set to 1 in consideration of incident light from the air.

In the present Example, in order to reproduce a surface on which the first convex structure 1 was not formed and only the second concave structure 2 was formed, the second concave structure 2 was approximated to a state where repetitive concavities and convexities corresponding to an average cycle of the second concave structure 2 were formed in a sinusoidal pattern, and an actual measurement of the sample of the present Example obtained from the AFM image shown in (b) of FIG. 10 was used as RMS (RMS=4.09 nm).

That is, the calculated value in FIG. 14 indicates a reproduced reflectance of a sample in which the first convex structure 1 was not formed and only the second concave structure 2 was formed on the surface and RMS was equal to that of the sample of the present Example.

As shown in FIG. 14, the sample of the present Example clearly exhibited a remarkably lower reflectance in the ultraviolet region than the calculated value. This is considered as the effect yielded by formation of both the first convex structure 1 and the second concave structure 2. This indicates that even when RMS is identical, formation of both the first convex structure and the second concave structure as in the present application allows increasing an antireflection effect in the short wavelength region.

Therefore, the antireflective structure of the present Example yields a larger antireflection effect particularly in a short wavelength due to a smaller height (depth) of convexities and concavities than the case where only the second concave structure 2 is formed.

(Combination of Base Substance Material and Supply Material)

It is known that Ta used for the supply source 103 in the present Example has a melting point of approximately 2996° C., and surface energy at 298K is approximately 3018 erg/cm². On the other hand, it is known that Si used for the base substance 104 has a melting point of approximately 1414° C. and surface energy at 298K is approximately 1107 erg/cm².

As described above, a combination of the materials (elements) used in the present Example is designed such that the material (element) for the supply source 103 has higher surface energy than that of the material (element) for the surface of the base substance 104, and fine particles serving as the first convex structure 1 on the base substance 104 are made of a material (element) having low wettability with respect to the surface of the base substance 104.

(Process on Base Substance 104)

In the present Example, there was formed the first convex structure 1 both on the base substance 104 whose substrate had been washed beforehand to remove natural adsorbate and natural oxidized film thereon and on the base substrate 104 whose substrate had not been washed and natural adsorbate and natural oxidized film remained thereon. Observation with AFM of the shapes of the two base substances 104 showed that there is no remarkable difference between them.

Accordingly, there is no significant influence of the adsorbate existing several nm or so beneath the surface of the base substance 104, and the material existing several ten nm beneath the surface of the base substance 104 is particularly important.

In the present Example, heating and cooling of the base substance 104 were not made. Alternatively, a substrate may be heated or cooled in order to control the size and the interval of formed fine particles.

(Regulation of Size of Concave and Convex Structure)

In the present invention, when forming the first convex structure 1 and the second concave structure 2, changing a radiated electric power and the time for radiating the electric power allows regulating the heights (depths) of the first convex structure 1 and the second concave structure 2, and allows regulating the periods and the diameters of the first convex structure 1 and the second concave structure 2 according to purposes.

It is particularly desirable that a difference between the maximum value and the minimum value of a high frequency voltage (Vpp) is not less than 100 V and not more than 2000 V. When Vpp is 100 V or more, kinetic energy of inert gas ions colliding with the supply source 103 is high enough to efficiently eject the supply material from the supply source 103, allowing stable formation of the first convex structure 1 and the second concave structure 2 on the base substance 104.

On the other hand, when Vpp is 2000 V or less, it is possible to prevent kinetic energy of inert gas ions colliding with the base substance 104 from being too large, thereby preventing unintended damage to the base substance 104 from forming an uneven concave and convex structure. This allows formation of the first convex structure 1 with high periodicity on the base substance 104, thereby allowing stable formation of the second concave structure 2 resulting from the presence of the first convex structure 1.

Furthermore, increasing the radiated electric power in the above range allows shortening the time for forming the antireflective structure of the present invention. This is desirable in terms of shortening of a production time.

Furthermore, in the present invention, when forming the first convex structure 1 and the second concave structure 2, varying the pressure of introduced inert gas allows controlling the shape of the first convex structure 1 and the second concave structure 2. Specifically, formation under low gas pressure allows reducing standard deviations of the sizes (diameters and heights) of the first convex structure 1 and the second concave structure 2.

Specifically, it is particularly desirable that a range of gas pressure when forming the antireflective structure is not less than $1.0 \times 10^{-2}$ Pa and not more than 1.0 Pa. When the gas pressure is not less than $1.0 \times 10^{-2}$ Pa, plasma can be discharged stably. When the gas pressure is not more than 1.0 Pa, it is possible to prevent the introduced inert gas from being taken into the fine particles constituting the first convex structure 1, thereby increasing uniformity of the size of the first convex structure 1, resulting in increased uniformity of the second concave structure 2.

In a case where the method for ejecting atoms etc. from the supply source 103 is not sputtering as in the present Example but radiation of an ion beam or an electron beam or evaporation of molecules by heating, it is possible to stably form the antireflective structure under lower gas pressure. In some cases, the antireflective structure may be formed without introducing inert gas such as Ar gas.

As described above, by regulating the radiated electric power, the time for radiating the electric power, and the gas pressure, it was possible to change the cycle of the first convex structure 1, so that the average cycle could be changed within the range of 7 nm to 40 nm regulatable by a device used.

In the present invention, formation of an antireflective structure may use inert gas other than Ar gas. Specifically, one or a plurality of gases selected from the group consisting of Ne, Ar, Kr, and Xe may be used.

Reference Example

As a reference example, an explanation is made as to the results of 2D-spectrum ((a) of FIG. 15) and 2D-power spectrum density ((b) of FIG. 15) obtained based on AFM observation of the surface shape of the Si wafer used as the base substance 104 in Example 1 (in a state not yet subjected to the treatment described in Example 1).

The surface of the Si wafer had the maximum vertical interval of 1.6 nm in a scanning range of 1 μm square and arithmetic mean roughness Ra of 0.15 nm.

Further, 2D spectrum in (a) of FIG. 15 did not show a ring-shaped bright portion as seen in Example 1. Further, power spectrum density in (b) of FIG. 15 did not show a clear peak as seen in Example 1.

Comparative Example 1

Comparative Example 1 shows the result of sputtering Ta to the base substance 104 to form a Ta film thereon, with use of a sputtering device in which an Si wafer identical with the base substance 104 in Example 1 was used as the base substance 104 and Ta used as the material for the supply source 103 in Example 1 was provided as a target on a position that faced the base substance 104.

When forming the Ta film, the ultimate vacuum of the sputtering device was set to $5 \times 10^{-5}$ Pa as in Example 1, Ar gas was introduced as in Example 1, and the pressure of Ar gas at the time of the introduction was set to $8.6 \times 10^{-2}$ Pa. A Ta target used here was of 6 inches in diameter. An electric power of DC20W that was the minimum dischargeable electric power was applied on the target and the Ta film was formed through sputtering for 900 seconds. The distance between the target and the base substance 104 was set to 160 mm. Application of a high-frequency voltage as in Example 1 was not performed on the base substance 104 and the base substance supporter 102.

The result of observation with AFM of the surface of the sample of Comparative Example 1 produced through the above method shows that the concavities and convexities having periodicity in nanometer order that were seen in Example 1 were not seen in Comparative Example 1. The maximum vertical interval was 2.2 nm and arithmetic mean roughness Ra was 0.16 nm in the observation in the scanning range of 1 μm square, which were smaller than those in Example 1.

The results of 2D spectrum and 2D power spectrum density of Comparative Example 1 based on the observation with AFM show that the bright ring-shaped portion that was seen in Example 1 was not seen. In the power spectrum density, a clear peak was not seen. From these results, it was confirmed that in the sample in Comparative Example 1, the first convex structure 1 was not formed.

Subsequent to the above process, sputtering was made for 3600 sec to form a film. The result of observation with AFM of the surface of the base substance 104 showed that a shape corresponding to the second concave structure 2 was not seen. This indicates that the method of Comparative Example 1 cannot form a concave and convex structure applicable to an antireflective structure. Furthermore, since film formation provides a metal Ta film with high reflectance on the surface of the base substance 104, the present sample is hard to be applied to an antireflective structure.

In addition, samples were prepared with different pressures of Ar gas, different radiated electric powers in sputtering, and different times for forming a film. However, in each case, the first convex structure 1 and the subsequent second concave structure 2 that were obtained in Example 1 were not formed. Furthermore, since film formation provides a metal film with high reflectance on the surface of the base substance 104, the present sample is hard to be applied to an antireflective structure.

The result of the present Comparative Example shows that in order to form the first convex structure 1 and the second concave structure 2 that were obtained in Example 1, it is necessary not only to supply atoms etc. from the supply source 103 to the base substance 104 but also to apply on the base substance supporter 102 (plus the base substance 104 if the base substance 104 is conducted) a high-frequency voltage varying positively and negatively with respect to a ground voltage, thereby repeating ejection of atoms etc. from the surface and reattachment of the atoms etc. to the surface.

Comparative Example 2

Comparative Example 2 shows an example of using Al as a target material instead of using Ta that was used as a target material in Comparative Example 1. In the present Comparative Example, An Al film was formed on the base substance 104 through sputtering while the base substance 104 was a Si wafer as in Comparative Example 1 and a sputtering device having an Al target at a position facing the base substance 104 was used.

In forming the Al film, ultimate vacuum of the sputtering device was set to $5\times10^{-5}$ Pa as in Comparative Example 1, and Ar gas was introduced as in Comparative Example 1, and the pressure at the time of the introduction of the gas was set to $8.6\times10^{-2}$ Pa. The Al target was of 6 inches in diameter, and an electric power of DC400 W was applied on the target and the Al film was formed through sputtering for 10 seconds. The distance between the target and the base substance 104 was set to 160 mm. Application of a high-frequency voltage as in Example 1 was not performed on the base substance 104 and the base substance supporter 102.

The result of observation with AFM of the surface of the sample of Comparative Example 2 produced through the above method in a scanning range of 1 μm square shows that in the present Comparative Example, particles agglomerated on the base substance 104 due to the low melting point of Al, and concavities and convexities were observed. The maximum vertical interval was 7.8 nm and arithmetic mean roughness was 0.58 nm when observing in the scanning range of 1 μm square. The sizes of individual concavities and convexities varied compared with Example 1.

The results of 2D spectrum and 2D power spectrum density of Comparative Example 2 based on the observation with AFM show that the bright ring-shaped portion that was seen in Example 1 was not seen. In the power spectrum density, a clear peak was not seen.

Subsequent to the above process, sputtering was made for 3600 sec to form a film. The result of observation with AFM of the surface of the base substance 104 showed that a shape corresponding to the second concave structure 2 was not seen in the present Comparative Example as in Comparative Example 1. Furthermore, since film formation provides a metal Al film with high reflectance on the surface of the base substance 104, the present sample is hard to be applied to an antireflective structure.

From these results, it was confirmed that in the sample in Comparative Example 2, concavities and convexities can be formed on the surface of the base substance 104 due to agglomeration of Al, but the formed concavities and convexities had low uniformity. Furthermore, since a sputter-etching process was not employed, film formation by continuous sputtering did not provide the second concave structure 2.

In addition, samples were prepared with different pressures of Ar gas, different radiated electric powers in sputtering, and different times for forming a film. However, in each case, the first convex structure 1 and the subsequent second concave structure 2 that were obtained in Example 1 were not formed.

Comparative Example 3

In the present Comparative Example, the same operation as Example 1 was performed except that the material of the supply source 103 was changed from Ta to Al. it should be noted that the present Comparative Example was different from Example 1 in that the pressure of introduced gas was set to $8.6\times10^{-2}$ Pa and the radiated electric power when supplying Al to the base substance 104 was set to 200 W. These conditions are conditions that would have allowed formation of the first convex structure 1 and the second concave structure 2 if Ta of Example 1 were used as the supply source 103.

The supply source 103 that was an Al film was formed in the same way as the supply source 103 that was a Ta film in Example 1. An Al film of 500 nm in thickness was formed on the surface of the base substance supporter 102 with a sputtering device beforehand, and the Al film was used as the supply source 103.

The result of observation with AFM of the surface shape of the sample of Comparative Example 3 in the scanning range of 1 μm square produced through the above method by 900 sec sputtering shows that in Comparative Example 3, the first convex structure 1 with periodicity in nanometer order that was seen in Example 1 was not seen, and the maximum vertical interval was 2.1 nm and arithmetic mean roughness Ra was 0.13 nm in the observation in the scanning range of 1 μm square, which were smaller than those in Example 1.

2D spectrum and 2D power spectrum density of the sample were obtained based on the observation with AFM. The results show that the bright ring-shaped portion that was seen in Example 1 was not seen in the 2D spectrum, and a clear peak was not seen in the power spectrum density, as in Reference Example and Comparative Example 1. From these results, it was confirmed that in the sample in Comparative Example 3, the first convex structure 1 with periodicity was not formed.

Subsequent to the above process, application of a high frequency voltage was made for 6000 sec and the surface of the base substance 104 was observed with AFM. The result of observation showed that a shape corresponding to the second concave structure 2 was not seen, which indicates that the method of Comparative Example 3 cannot form a concave and convex structure applicable to an antireflective structure.

Al used for the supply material 103 in the present Comparative Example is a material that has a lower melting point than Si used for the base substance 104 and that cannot be combined with Si to produce a compound. The result of the present Comparative Example shows that it is desirable that the material for the supply source 103 has a higher melting point than the material for the surface of the substrate 104 so that the surface of the base substance 104 exhibits low wettability with respect to the material for the supply source 103, and that it is more desirable that the materials for the supply source 103 and the surface of the substrate 104 are materials that can be combined with each other to produce a compound.

In addition, MgO that is hard to sputter was examined whether MgO was suitable for the material for the supply source 103 or not. As a result, it was confirmed that the first convex structure 1 and the second concave structure 2 that were obtained in Example 1 could not be formed as in the case of Al. That is, it was confirmed that it is impossible to form the first convex structure 1 and the subsequent second concave structure 2 even when other element is not supplied to the surface of the base substance 104.

Comparative Example 4

In Comparative Example 4, the same operation as in Example 1 was performed except that the base substance 104 was not a Si wafer but a thermally oxidized Si wafer obtained by thermally oxidizing the surface of a Si wafer.

It should be noted that the present Comparative Example was different from Example 1 in that the pressure of introduced Ar gas was set to $8.6\times10^{-2}$ Pa and the radiated electric power when supplying Ta to the base substance 104 was set to 200 W. These conditions are conditions that would have allowed formation of the first convex structure 1 and the second concave structure 2 if the Si wafer of Example 1 were used as the base substance 104.

The thermally oxidized Si wafer used in the present Comparative Example was obtained by thermally oxidizing a Si wafer so that a portion between the surface and a point away from the surface by 500 nm or more was an oxidized Si.

The result of observation with AFM of the surface shape of the sample of Comparative Example 4 in the scanning range of 1 µm square, the sample being prepared by using the thermally oxidized Si wafer as the base substance 104, shows that in Comparative Example 4, the first convex structure (fine particles) with periodicity in nanometer order that was seen in Example 1 was not seen as in Comparative Examples 1 and 3, and the maximum vertical interval was 2.7 nm and arithmetic mean roughness Ra was 0.19 nm, which were smaller than those in Example 1.

2D spectrum and 2D power spectrum density of the sample were obtained based on the observation with AFM. The results show that the bright ring-shaped portion that was seen in Example 1 was not seen in the 2D spectrum, and a clear peak was not seen, as in Reference Example and Comparative Examples 1 to 3. From these results, it was confirmed that in the sample in Comparative Example 4, the first convex structure 1 with periodicity was not formed.

Subsequent to the above process, application of a high frequency voltage was made for 6000 sec and the surface of the base substance 104 was observed with AFM. The result of observation showed that a shape corresponding to the second concave structure 2 was not seen, which indicates that the method of Comparative Example 4 cannot form a concave and convex structure applicable to an antireflective structure.

Oxidized Si used for the surface of the base substance 104 in the present Comparative Example is a material that cannot be combined with Ta for the supply source 103 to produce a compound in a process at a room temperature. The result of the present Comparative Example shows that it is desirable that the materials for the supply source 103 and the surface of the base substance 104 are materials that can be combined with each other to produce a compound, as in Comparative Example 2.

Comparative Example 5

In Example 1, both in the first step of forming the first convex structure 1 and in the second step of forming the second concave structure 2, Si on the surface of the base substance 104 was sputter-etched while Ta was supplied as the supply material from the supply source 103 to form an antireflective structure. In the present Comparative Example, the first step was carried out in the same manner as in Example 1 and in the second step, a Si substrate was subjected to sputter-etching while Ta was not supplied.

Specifically, in the present Comparative Example, in the first step, the first convex structure 1 was formed in the same manner as in Example 1. Thereafter, the second step was carried out while the base substance 104 on which the first convex structure 1 had been formed was supported, provided that there was used a sputter-etching device having the base substance supporter 102 that supports the base substance 104 in such a manner that an extremely small area runs off the edge of the base substance 104, and that a Ta layer serving as the supply source had not been formed on the base substance supporter 102 before the base substance supporter 102 supported the base substance 104.

At that time, an electric power applied in the second step in the present Comparative Example was adjusted such that an applied electric power per unit area of the base substance 104 was substantially identical between the present Comparative Example and Example 1 in consideration of the difference in size of the base substance supporter 102 between the present Comparative Example and Example 1.

It was found from the result that in the case of carrying out the second step without supplying Ta that was the supply material as in the present Comparative Example, the height of the first convex structure 1 was reduced during the treatment for 600 sec., showing that the surface of the base substance 104 was made flatter. When the time for the treatment was longer, the surface of the base substance 104 was made further flatter, and consequently the second concave structure 2 obtained in Example 1 was not obtained in the present Comparative Example.

In consideration of the above, in the etching treatment in the second step, it is important to carry out the sputter-etching treatment while supplying the element constituting the convexities 1a so that the convexities 1a formed in the first step was not lost during the second step.

In other words, in order to realize the second concave structure 2 having the antireflection effect in the second step, it is important to keep the first convex structure 1 on the surface during the second step.

Example 2

The operation in Example 2 was the same as that in Example 1 except that the Si wafer used for the base substance 104 in Example 1 was replaced with an element obtained by forming a Si film with a thickness of 500 nm on the surface of a glass substrate (barium borosilicate glass).
(Structure of Base Substance 104)

The glass substrate used as the base substrate 104 in the present Example has a surface made of a material that is difficult to be combined with the material for the supply source 103 (Ta) to form a compound, as in the case of the thermally oxidized Si wafer used in Comparative Example 4. Accordingly, the same operation as that in Example 1 without formation of the Si film did not provide the first convex structure 1 and the second concave structure 2.

In contrast thereto, in the present Example, the Si film was formed on the glass substrate so that the surface of the base substance 104 was made of a material (Si) that can be combined with the material (Ta) for the supply source 103 to form a compound.

The base substance 104 in the present Example was produced by forming a 500 nm Si film on the glass substrate through sputtering. Ultimate vacuum was set to $5 \times 10^{-6}$ Pa, and Ar gas was introduced in forming the Si film. Gas pressure at the time of forming the Si film was $1.0 \times 10^{-1}$ Pa. Si used as a sputtering target was a Si monocrystalline target to which B was doped and whose resistivity was 0.1 Ωcm or less, and the Si film was formed through RF sputtering.

The base substance 104 on the surface of which the Si film was formed as described above was supported by the base substance supporter 102 on the surface of which a 500 nm Ta film was formed by a sputtering device beforehand, as in Example 1.

(Other Settings)

Inert gas to be introduced into the vacuum chamber 101 in forming fine particles was Ar gas as in Example 1, and pressure at the time of the introduction of the Ar gas was set to $1.3 \times 10^{-2}$ Pa. Application of a high-frequency voltage from the high-frequency power source 105 to the base substance supporter 102 was controlled so that a radiated electric power was constantly 300 W Application of a high frequency voltage in the step of forming the first convex structure 1 was carried out for 1200 sec. The difference (Vpp) between the maximum value and the minimum value of the high-frequency voltage in preparing the sample ranged from approximately 730V to 800V, and a value (Vdc) obtained by subtracting a ground voltage from the average value of the high-frequency voltage ranged from approximately −220V to −250V.

(Observation of Surface Shape of Base Substance 104)

The surface shape of the base substance 104 of the sample of the present Example was observed by AFM as in Example 1. The result of the observation shows that the surface of the base substance 104 at the stage where the first convex structure 1 was formed was such that the maximum vertical interval was 6.4 nm and arithmetic mean roughness Ra was 0.74 nm in a scanning range of 1 μm square. The 2D-spectrum shows a ring-shaped bright portion in a frequency range corresponding to a range of 13 nm to 38 nm, which clarifies that the first convex structure 1 prepared in the present Example has strong periodicity in a very narrow range of 13 nm to 38 nm.

On the other hand, the power spectrum density shows a clear peak in the range of 13 nm to 38 nm, and the position where the peak was the highest was at 23 nm.

(Principle by which Second Concave Structure 2 is Formed)

By continuously subjecting the base substance 104 on which the first convex structure 1 has been formed to the treatment in the present Example, it is possible to form the second concave structure 2 similarly with Example 1.

The reason is as follows. As in Example 1, when the surface on which the first convex structure 1 has been formed is subjected to the sputter-etching treatment, sputter-etching proceeds strongly at a portion of the base substance 104 which portion is exposed to the surface originally (portion where the first convex structure 1 does not exist) and some of generated inert gas ions are prevented by the first convex structure 1 from reaching the surface of the base substance 104 which surface is at the back of the first concave structure 1. Consequently, symmetry in the sputter-etching is impaired, ripples are not cancelled, and the sputter-etching proceeds particularly at a portion with a large etching strength due to overlapping (interference) of ripples, so that the second convex structure 2 grows.

Specifically, the step of forming the second concave structure 2 is carried out in such a manner that a high frequency voltage is applied for 6000 sec. to form the second concave structure 2. The step of forming the first convex structure 1 and the step of forming the second concave structure 2 may be carried out consecutively so that these steps are included in a single process in actual operation. Furthermore, the radiated electric power may be made large insofar as the shape of the antireflective structure is not impaired, thereby reducing a process time.

Furthermore, the first convex structure 1 and the second concave structure 2 may be formed in such a manner that the first convex structure 1 is formed by the method in the present Example and thereafter the second concave structure 2 is formed by the method in Example 2 or 3.

As described above, when the surface of the base substance 104 is made of a material (Si in the present Example) capable of being combined with the material for the supply source 103 (Ta in the present Example) to form a compound, it is possible to form an antireflective structure with high quality.

(Thickness of Thin Film as Base Substance Material)

In a case of forming on the surface of the base substance 104 a thin film made of a material that can be combined with the material for the supply source 103 to produce a compound, it is necessary to be taken into consideration that the surface of the base substance 104 is etched by application of a high-frequency voltage. Specifically, the thin film formed on the surface of the base substance 104 is set to have a thickness larger than the thickness etched from the base substance 104 during the process of forming the antireflective structure. This prevents the thin film from being removed completely by etching and thus prevents a base material from being exposed in the process of forming the antireflective structure.

Modification Examples

In the present Example, a Si monocrystalline target to which B was doped and which had a resistivity of 0.1 Ωcm or less was used. However, the target material is not limited to this as long as the target material allows formation of a desired antireflective structure. The target material may contain different amounts of different additives, or may have no additive. Further, since a film formed through sputtering is not a monocrystal, the target material is not necessarily a monocrystal.

In the present Example, an explanation was made as to a case where a Si film was formed on the barium borosilicate glass substrate. In addition to this case, also in the cases of forming a Si film on a $SiO_2$ substrate, a thermally oxidized Si substrate, and a polycarbonate substrate, formation of an antireflective structure including the first convex structure 1 and the second concave structure 2 was confirmed.

The above results show that when forming the antireflective structure of the present invention, the base material for the base substance 104 is not particularly limited, and the kind of the material formed on the surface of the base substance 104 (formed in the range that is approximately several ten nm beneath the surface in a depth direction) is important. Further, in view of the fact that the first convex structure 1 and the second concave structure 2 were obtained even when the non-conductive material was used as the base material for the base substance 104, the base substance supporter 102 is not necessarily required to be electrically connected with the base substance 104.

Further, although heating of the substrate and cooling of the substrate were not performed in the present Example, the heating of the substrate or the cooling of the substrate may be performed in order to adjust the size of a resulting fine particle or the distance between resulting fine particles.

Example 3

Example 3 shows a case where the first convex structure 1 was produced with use of the antireflective structure production device 21 including the blocking member 208 shown in FIG. 7.

(Structures of Individual Members)

In the present Example, the vacuum chamber 101 whose ultimate vacuum was $5\times10^{-5}$ Pa was used and the base substance supporter 102 was a stainless steel as in Example 1. A film of 200 nm in thickness made of MgO that was a material hard to be sputtered was formed on the surface of the base substance supporter 102 by a sputtering device beforehand, so that atoms etc. were hard to be supplied from the base substance supporter 102 to the base substance 104 in applying a high-frequency voltage. The MgO film was formed on the whole area of the surface of the base substance supporter 102 to which surface the base substance 104 was to be attached. As in Example 1, the base substance 104 was a P-type Si wafer (plane direction (100)) to which B was doped. The base substance 104 had a diameter of 76 mm, and was fixed by a spring member onto the base substance supporter 102 with the MgO thin film formed thereon. A sputtering target material that was the supply source 203 was Ta of 152 mm in diameter. The supply source 203 was positioned to face the base substance 104 and the distance between the supply source 203 and the base substance 104 was set to 160 mm.

(Positioning and Significance of Blocking Member 208)

The blocking member 208 was a stainless disc of 216 mm in diameter and 3 mm in thickness, and was positioned on a line connecting the supply source 203 and the base substance 104 in such a manner as to be away from the supply source 203 by 30 mm and to face the supply source 203. The blocking member 208 was electrically grounded.

With such positioning of the blocking member 208, atoms etc. (Ta) ejected from the supply source 203 through sputtering was prevented from being directly and linearly incident to the base substance 104, so that atoms etc. that were diffused due to collision with inert gas in film-formation atmosphere or other atoms etc. from the supply source 203 or atoms etc. with low energy that were diffused or diffracted due to collision with the blocking member 208 reach the base substance 104.

(Other Settings)

Inert gas to be introduced to the vacuum chamber 101 in forming the antireflective structure was Ar gas, and pressure at the time of the introduction of the Ar gas was set to $8.6\times10^{-2}$ Pa. As in Example 1, the high-frequency power source 105 was a power source whose frequency was 13.56 MHz and which could apply an electric power of 1 kW or less. When applying a high-frequency voltage from the high-frequency power source 105 to the base substance supporter 102, as illustrated in FIG. 7, an end of the high-frequency power source 105 which end was opposite to the base substance supporter 102 was electrically grounded and was connected with the side wall of the vacuum chamber 101 to have the same potential, and control was performed so that a radiated electric power was constant.

In the present Example, application of a high-frequency voltage was performed so that a radiated electric power was 200 W. Since the surface of the base substance supporter 102 to which surface the base substance 104 was attached had a diameter of 550 mm, the magnitude of the radiated electric power per unit area was 0.08 W/cm$^2$. Further, the adjustor 106 made adjustment so that a reflected electric power was 5 W or less. As a result, while forming the antireflective structure, Vdc and Vpp varied in the range of −70 to −140V and in the range of 820 to 850V, respectively. These ranges indicate states where the applied high-frequency voltage varied positively and negatively with respect to a ground voltage.

When forming the first convex structure 1, the high-frequency voltage was applied for 600 seconds continuously. A DC sputtering power source was electrically connected with the supply source 203 and an electric power of 450 W was applied to sputter the Ta target. Since the Ta target had a diameter of 152 mm, an electric power per unit area supplied to the target was 2.5 W/cm$^2$. The distance between the surface of the base substance supporter 102 to which surface the base substance 104 was attached and the wall of the vacuum chamber 101 facing the surface was set to 200 mm.

(Observation of Surface Shape of Base Substance 104)

The surface shape of the base substance 104 of the sample of the present Example was observed by AFM. The result of the observation shows that the surface of the base substance 104 at the stage where the first convex structure 1 was formed was such that the maximum vertical interval was 7.3 nm and arithmetic mean roughness Ra was 0.70 nm in a scanning range of 1 μm square. The 2D-spectrum shows a ring-shaped bright portion in a frequency range corresponding to a range of 11 nm to 31 nm, which clarifies that the first convex structure 1 prepared in the present Example has strong periodicity in a very narrow range of 11 nm to 31 nm.

On the other hand, the power spectrum density shows a clear peak in the range of 11 nm to 31 nm, and the position where the peak was the highest was at 20 nm.

(Principle by which Second Concave Structure 2 is Formed)

By continuously subjecting the base substance 104 on which the first convex structure 1 has been formed to the treatment in the present Example, it is possible to form the second concave structure 2 similarly with Example 1.

The reason is as follows. As in Example 1, when the surface on which the first convex structure 1 has been formed is subjected to the sputter-etching treatment, sputter-etching proceeds strongly at a portion of the base substance 104 which portion is exposed to the surface originally (portion where the first convex structure 1 does not exist) and some of generated inert gas ions are prevented by the first convex structure 1 from reaching the surface of the base substance 104 which surface is at the back of the first concave structure 1. Consequently, symmetry in the sputter-etching is impaired, ripples are not cancelled, and the sputter-etching proceeds particularly at a portion with a large etching strength due to overlapping (interference) of ripples, so that the second convex structure 2 grows.

Specifically, the step of forming the second concave structure 2 is carried out in such a manner that a high frequency voltage is applied for 3000 sec. to form the second concave structure 2.

The step of forming the first convex structure 1 and the step of forming the second concave structure 2 may be carried out consecutively so that these steps are included in a single process in actual operation. Furthermore, the radiated electric power may be made large insofar as the shape of the antireflective structure is not impaired, thereby reducing a process time.

Furthermore, the first convex structure 1 and the second concave structure 2 may be formed in such a manner that the first convex structure 1 is formed by the method in the present Example and thereafter the second concave structure 2 is formed by the method in Example 1 or 3.

Although heating of the substrate and cooling of the substrate were not performed in the present Example, the heating of the substrate or the cooling of the substrate may be performed in order to adjust the size of a resulting fine particle or the distance between resulting fine particles.

Example 4

Example 4 shows an example in which the first convex structure 1 was formed using the antireflective structure production device 31 shown in FIG. 8.
(Structures of Individual Members)

In the present Example, the vacuum chamber 101 whose ultimate vacuum was $5 \times 10^{-5}$ Pa was used and the base substance supporter 102 was a stainless steel as in Example 1. A film of 200 nm in thickness made of MgO that was a material hard to be sputtered was formed on the surface of the base substance supporter 102 by a sputtering device beforehand, so that atoms etc. were hard to be supplied from the base substance supporter 102 to the base substance 104 in applying a high-frequency voltage. The MgO film was formed on the whole area of the surface of the base substance supporter 102 to which surface the base substance 104 was to be attached.

As in Example 1, the base substance 104 was a P-type Si wafer (plane direction (100)) to which B was doped. The base substance 104 had a diameter of 76 mm, and was fixed by a spring member onto the base substance supporter 102 with the MgO thin film formed thereon.
(Positioning of Supply Source 203)

A sputtering target material that was the supply source 203 was Ta of 152 mm in diameter. The supply source 203 and the base substance 104 were positioned so that surfaces thereof were parallel to each other and the angle θ in FIG. 8 was 55 degrees. The distance between the supply source 203 and the base substance supporter 102 was set to 160 mm.
(Other Settings)

Inert gas to be introduced to the vacuum chamber 101 in forming the antireflective structure was Ar gas, and pressure at the time of the introduction of the Ar gas was set to $1.7 \times 10^{-2}$ Pa.

As in Example 1, the high-frequency power source 105 was a power source whose frequency was 13.56 MHz and which could apply an electric power of 1 kW or less. As illustrated in FIG. 8, when applying a high-frequency voltage from the high-frequency power source 105 to the base substance supporter 102, an end of the high-frequency power source 105 which end was opposite to the base substance supporter 102 was electrically grounded and was connected with the side wall of the vacuum chamber 101 to have the same potential, and control was performed so that a radiated electric power was constant.

In the present Example, application of a high-frequency voltage was performed so that a radiated electric power was 400 W. Since the surface of the base substance supporter 102 to which surface the base substance 104 was attached had a diameter of 550 mm, the magnitude of the radiated electric power per unit area was 0.17 W/cm². Further, the adjustor 106 made adjustment so that a reflected electric power was 5 W or less.

As a result, while forming the antireflective structure, Vdc and Vpp varied in the range of −259 to −300V and in the range of 1000 to 1080V, respectively. These ranges indicate states where the applied high-frequency voltage varied positively and negatively with respect to a ground voltage.

The high-frequency voltage was applied for 300 seconds continuously when forming the first convex structure 1. A DC sputtering power source was electrically connected with the supply source 203 and an electric power of 20 W was supplied to the supply source 203 so that the Ta target was sputtered as well as the above high-frequency voltage was applied.

Since the Ta target had a diameter of 152 mm, an electric power per unit area supplied to the target was 0.11 W/cm². The distance between the surface of the base substance supporter 102 to which surface the base substance 104 was attached and the wall of the vacuum chamber 101 facing the surface was set to 200 mm.
(Observation of Surface Shape of Base Substance 104)

The surface shape of the base substance 104 of the sample of the present Example was observed by AFM. The result of the observation shows that the surface of the base substance 104 at the stage where the first convex structure 1 was formed was such that the maximum vertical interval was 5.7 nm and arithmetic mean roughness Ra was 0.63 nm in a scanning range of 1 μm square. The 2D-spectrum shows a ring-shaped bright portion in a frequency range corresponding to a range of 15 nm to 38 nm, which clarifies that the first convex structure 1 prepared in the present Example has strong periodicity in a very narrow range of 15 nm to 38 nm.

On the other hand, the power spectrum density shows a clear peak in the range of 15 nm to 38 nm, and the position where the peak was the highest was at 25 nm.
(Principle by which Second Concave Structure 2 is Formed)

By continuously subjecting the base substance 104 on which the first convex structure 1 has been formed to the treatment in the present Example, it is possible to form the second concave structure 2 similarly with Example 1

The reason is as follows. As in Example 1, when the surface on which the first convex structure 1 has been formed is subjected to the sputter-etching treatment, sputter-etching proceeds strongly at a portion of the base substance 104 which portion is exposed to the surface originally (portion where the first convex structure 1 does not exist) and some of generated inert gas ions are prevented by the first convex structure 1 from reaching the surface of the base substance 104 which surface is at the back of the first concave structure 1. Consequently, symmetry in the sputter-etching is impaired, ripples are not cancelled, and the sputter-etching proceeds particularly at a portion with a large etching strength due to overlapping (interference) of ripples, so that the second convex structure 2 grows.

Specifically, the step of forming the second concave structure 2 is carried out in such a manner that a high frequency voltage is applied for 1500 sec. to form the second concave structure 2. The step of forming the first convex structure 1 and the step of forming the second concave structure 2 may be carried out consecutively so that these steps are included in a single process in actual operation. Furthermore, the radiated electric power may be made large insofar as the shape of the antireflective structure is not impaired, thereby reducing a process time.

Furthermore, the first convex structure 1 and the second concave structure 2 may be formed in such a manner that the first convex structure 1 is formed by the method in the present Example and thereafter the second concave structure 2 is formed by the method in Example 1 or 2.

(Significance of Angle θ)

The angle θ formed by (i) a line connecting an end of the supply source 203 which end was closest to the base substance 104 and an end of the base substance 104 which end was closest to the supply source 203 and (ii) a line extending from the surface of the supply source 203 was changed. When the angle θ was more than 55 degrees, although the base substance 104 on which the first convex structure 1 had been formed had concavities and convexities on its surface, particles grown on the substrate 104 were coupled with each other, so that the particles were randomly connected with each other to have an elongated shape in a plane direction of the base substance 104. A power spectrum density graph obtained by subjecting the result of observation with AFM (scanning range: 1 μm) in this case to 2D Fourier transformation did not show a clear peak, indicating that high periodicity was not obtained.

The reason seems to be as follows. Since atoms etc. (Ta) were directly supplied from the supply source 203 to the base substance 104, atoms etc. having reached the substrate 104 had excessively large kinetic energy, which caused fine particles formed on the base substance 104 to collide with adjacent fine particles, and these fine particles were coupled with each other irregularly.

On the other hand, when the angle θ ranged from 25 to 55 degrees, the power spectrum density graph showed a clear peak. Thus, it was confirmed that fine particles (concavities and convexities) with high periodicity were formed as the first convex structure 1. Further, fine particles were seen to be formed while being isolated from each other.

In the device used in the above experiment, the angle θ could not be made smaller than 25 degrees due to the structure of the device. Note that even when the angle θ is made further smaller, it is possible to form the first convex structure 1 with high periodicity by adjusting an electric power to be supplied to the supply source 203 according to necessity.

In the present Example, heating and cooling of the base substance 104 were not made. Alternatively, a substrate may be heated or cooled in order to control the size and the interval of formed fine particles.

Example 5

Examples 1 to 4 showed examples in which the material for the surface of the base substance 104 was Si and the material to be supplied (supply source 103 or 203) was Ta. Materials other than Si and Ta can yield similar results if the materials are selected so that the materials are likely to be combined with each other to produce a compound and allow formation of fine particles in nanometer order on the base substance 104. In the present Example, combinations of materials applicable to First to Third Embodiments are explained.

As described above, Non-patent Literature 2 shows binary alloy phase diagrams of various elements. By referring to a binary alloy phase diagram of Si and Ta, a binary alloy phase diagram of Si and W, and a binary alloy phase diagram of Si and Mo, it is found that each of the above combinations including the combination of Si and Ta used in Examples 1 to 4 is likely to produce a compound in a wide composition range. In addition to these combinations, the binary alloy phase diagrams in Non-patent Literature 2 show that a compound is likely to be produced when the combination is determined such that Si is replaced with Ge or Al or when Ta, W, or Mo is replaced with a transition metal material on the periodic table of the elements.

Further, in order to increase low wettability with the surface of the base substance 104, it is generally desirable that the produced compound has a high melting point and a difference in temperature between the melting point of the produced compound and the melting point of the base substance material (element) is large.

In view of the above, it is particularly desirable that the material for the supply source 103 (203) is a material mainly containing an element selected from the group consisting of V, Cr, Zr, Nb, Mo, Tc, Ru, Rh, Pd, Hf, Ta, W, Re, Os, Ir, and Pt that are materials with high melting points among transition metals or a material mainly containing alloys of these materials, and the material for the surface of the base substance 104 is a material mainly containing an element selected from Al, Si, and Ge or a material mainly containing alloys of these materials. The material for the supply source 103 (203) may be a compound between the aforementioned material suitable for the supply material and the aforementioned material suitable for the base substance material.

Example 6

Example 6 shows the result of actually preparing the first convex structure 1 using Si and W for the substrate 104 and the supply source 103, respectively, which is an example of a combination of materials shown in Example 5 and applicable to First to Third Embodiments.

In the present Example, the same operation as in Example 1 was performed except that the supply source 103 is made of W instead of Ta, ultimate vacuum of the vacuum chamber 101 was $8.5 \times 10^{-5}$ Pa, pressure at the time of introduction of Ar gas was $1.3 \times 10^{-1}$ Pa, and a radiated electric power of the high-frequency power source 105 was 100 W.

The first convex structure 1 prepared by applying a high frequency voltage for 900 sec. by the method of the present Example was observed with AFM. The result of the observation showed that when the supply source 103 is made of W, too, there is provided a surface shape made of arrayed periodic convexities. The maximum vertical interval was 4.0 nm and arithmetic mean roughness Ra was 0.34 nm in the scanning range of 1 μm square. The fine particles were seen to be formed while being isolated.

2D-Fourier-transformed spectrum and 2D-Fourier-transformed power spectrum density were obtained. The 2D-Fourier-transformed spectrum showed a ring-shaped bright portion in the range of frequency corresponding to the range of 12 nm to 31 nm, indicating that the fine particles (convexities 1a) produced through the present Example had strong periodicity in the extremely narrow range of 12 nm to 31 nm. Further, the ring shape indicates that the fine particles are arrayed anisotropically with respect to a direction parallel to the surface of the substrate. The power spectrum density shows a clear peak in the range of 12 nm to 31 nm, and the position where the peak was highest was at 20 nm.

From the above results, it was confirmed that the first convex structure 1 produced in the present Example had strong periodicity in the extremely narrow range of 12 nm to 31 nm.

As described above, by continuously subjecting the base substance 104 on which the first convex structure 1 has been formed to the treatment in the present Example, it is possible to form the second concave structure 2 similarly with Example 1.

The reason is as follows. As in Example 1, when the surface on which the first convex structure 1 has been formed is subjected to the sputter-etching treatment, sputter-etching proceeds strongly at a portion of the base substance 104 which portion is exposed to the surface originally (portion where the first convex structure 1 does not exist) and some of generated inert gas ions are prevented by the first convex structure 1 from reaching the surface of the base substance 104 which surface is at the back of the first concave structure 1. Consequently, symmetry in the sputter-etching is impaired, ripples are not cancelled, and the sputter-etching proceeds particularly at a portion with a large etching strength due to overlapping (interference) of ripples, so that the second convex structure 2 grows.

Specifically, the step of forming the second concave structure 2 is carried out in such a manner that a high frequency voltage is applied for 4500 sec. to form the second concave structure 2. The step of forming the first convex structure 1 and the step of forming the second concave structure 2 may be carried out consecutively so that these steps are included in a single process in actual operation. Furthermore, the radiated electric power may be made large insofar as the shape of the antireflective structure is not impaired, thereby reducing a process time.

Furthermore, the first convex structure 1 and the second concave structure 2 may be formed in such a manner that the first convex structure 1 is formed by the method in the present Example and thereafter the second concave structure 2 is formed by the method in Example 1 or 2.

It is known that W used for the supply source 103 in the present Example has a melting point of approximately 3387° C. and surface energy of W at 298 K is approximately 3468 erg/cm$^2$.

On the other hand, it is known that Si used for the base substance 104 has a melting point of approximately 1414° C. and surface energy of Si at 298 K is approximately 1107 erg/cm$^2$.

In this manner, the combination of materials (elements) in the present Example is designed so that the material (element) for the supply source 103 has higher surface energy than the material (element) for the surface of the base substance 104, and fine particles formed on the base substance 104 exhibit low wettability with respect to the surface of the base substance 104.

Example 7

Example 7 is an example in which the antireflective structure of the present invention is formed on the base substance 104 as described in Fourth Embodiment and thereafter transferred onto the second base substance 404 by using a transfer material, and made to have a larger height by anisotropic etching, so that a larger antireflection effect is yielded.

As described in Example 1, the reflectance R of the surface where the antireflective structure is formed can be expressed in equation (1) above.

FIG. 16 is a view showing, using the equation (1) above, how the reflectance R changes in accordance with a change of surface roughness when enhancing the height (depth) of concavities and convexities by anisotropic etching in a case where the second base substance 404 is made of Si. Here, measured reflectance of a smooth Si wafer on which the antireflective structure had not been formed is $R_0$, and n was set to 1 in consideration of light incident from the air.

As shown in FIG. 16, as RMS (whose average is set to 0) increases, the reflectance R decreases monotonously so that the reflectance R can be reduced at a longer wavelength. The result of calculation shows that remarkable decrease in reflectance starts to be observed as RMS is approximately 4 nm or larger. When RMS is 90 nm or larger, the reflectance R can be 10% or less in the wavelength range of 190 to 900 nm.

Here, the concave and convex structure providing surface roughness is approximated by a sinusoidal wave shape. When RMS is 4 nm, the sinusoidal wave shape corresponds to a repeated convex and concave structure whose height (depth) is 14 nm. When RMS is 90 nm, the sinusoidal wave shape corresponds to a repeated convex and concave structure whose height (depth) is approximately 250 nm. When a repeated convex and concave structure with the above height (depth) is formed in such a manner that the average cycle of the repeated convex and concave structure in a direction along the surface of the second base substance 404 is equal to or smaller than the wavelength of light in use, the repeated convex and concave structure can function as a very satisfactory antireflective structure in the wavelength range from ultraviolet light to near-infrared light.

The concave and convex shape with the above height (depth) can be achieved by using the transfer layer 405 whose etching rate in anisotropic etching is approximately 1/10 of the etching rate of the material constituting the second base substance 404.

As described above, the antireflective structure of the present invention can be applied to not only an optical element for ultraviolet light but also an optical element for a wider wavelength by, as described in Fourth Embodiment, transferring a formed antireflective structure to other substrate or element through a transfer method such as nano-imprinting and thereafter subjecting the transferred antireflective structure to dry-etching or wet-etching to have a larger height, thereby yielding a further larger antireflection effect.

Furthermore, as shown in FIG. 14 of Example 1, since both of the first convex structure 1 and the second concave structure 2 are formed, the presence of the first convex structure 1 whose cycle is smaller than that of the second concave structure 2 allows further enhancing an antireflection effect in the short wavelength region compared with the case where only the second concave structure 2 is formed.

In the case where the antireflective structure of the present invention is further transferred onto other base substance or an optical element by a transfer method such as nano-imprinting, when the number of transferring is odd, the first convex structure 1 is inverted to be a concave structure and the second concave structure 2 is inverted to be a convex structure.

As described above, the average pitch between the plurality of large concavities is preferably 1.2 times to 10 times larger than the average pitch between the plurality of small convexities.

Furthermore, the average pitch between the plurality of small convexities is preferably not less than 7 nm and not more than 40 nm.

Furthermore, the average pitch between the plurality of large concavities is preferably not less than 28 nm and not more than 250 nm.

In the process for production of the present invention, the pitch between large concavities is determined depending on the pitch between small convexities, and the average pitch between large concavities is 1.2 times to 10 times larger than the average pitch between small convexities.

Specifically, the average pitch between small convexities can be not less than 7 nm and not more than 40 nm, and the average pitch between large concavities can be not less than 28 nm and not more than 250 nm.

With the arrangement, the average pitch between small convexities and the average pitch between large concavities can be smaller than the wavelength ranging from the ultraviolet region to the near-infrared region (approximately 30 to 2500 nm), so that the antireflection effect of light in the ultraviolet region and the near-infrared region can be enhanced.

The average pitch between small convexities and the average pitch between large concavities may be determined depending on the wavelength of incident light (or emission light). For example, in a case where the wavelength of incident light is 100 nm, the average pitch between small convexities and the average pitch between large concavities may be set to be smaller than 100 nm.

The present invention is not limited to the description of the embodiments above, but may be altered by a skilled person within the scope of the claims. An embodiment based on a proper combination of technical means disclosed in different embodiments is encompassed in the technical scope of the present invention.

Furthermore, it is preferable to arrange the antireflective structure of the present invention such that an average pitch between the plurality of large concavities is 1.2 times to 10 times larger than an average pitch of the plurality of small convexities.

Furthermore, it is preferable to arrange the antireflective structure of the present invention such that an average pitch between the plurality of small convexities is not less than 7 nm and not more than 40 nm.

Furthermore, it is preferable to arrange the antireflective structure of the present invention such that an average pitch between the plurality of large concavities is not less than 28 nm and not more than 250 nm.

A similar configuration of the average pitch between the plurality of large concavities and the average pitch between the plurality of small convexities in the antireflective structure is preferably applicable to the average pitch between the plurality of large convexities and the average pitch between the plurality of small concavities.

It is preferable to arrange the antireflective structure of the present invention such that each of the plurality of small convexities contains one of V, Cr, Fe, Zr, Nb, Mo, Tc, Ru, Rh, Pd, Hf, Ta, W, Re, Os, Ir, and Pt.

Since the above materials have high surface energy and therefore have low wettability when evaporated on a base substance with low surface energy. That is, the above materials do not spread evenly on the surface of the base substance but become in a dot-like manner.

Use of the above materials as a material for forming the small convexities allows forming the convexities in a dot-like manner on the surface of the base substance, thereby putting the pitch between the convexities within a certain range.

Furthermore, it is preferable to arrange the antireflective structure of the present invention so as to further include a base substance on which the plurality of small convexities are formed, a surface of the base substance containing one of Al, Si, and Ge or an alloy thereof.

Al, Si, and Ge have low melting points and have low surface energies. Substances with large surface energy difference between them exhibit unfamiliarity with each other at their surfaces. Accordingly, when the material for the small convexities has large surface energy, the material for the small convexities exhibits low wettability with respect to the surface of the base substance. Consequently, the small convexities can be formed on the surface of the base substance in a dot like manner, so that the pitch between the plurality of small convexities can be made even easily.

Furthermore, an optical element having the antireflective structure thereon is also encompassed in the technical scope of the present invention. The antireflective structure allows effectively preventing reflection of light incident to the optical element or of light emitted from the optical element. The antireflective structure and the optical element may be produced separately and then combined with each other. Alternatively, the antireflective structure may be formed on the surface of the optical element.

The present invention may be expressed as follows.

That is, an antireflective structure of the present invention is an antireflective structure for preventing reflection on a surface of an optical element, including: a first convex structure or a first concave structure obtained by repeatedly forming a first convexity or a first concavity in a direction along a surface of the optical element on which surface the antireflective structure is formed, a length of the first convexity or the first concavity in the direction along a surface of the optical element on which surface the antireflective structure is formed being smaller than a wavelength of light incident to or emitted from the optical element; and a second concave structure or a second convex structure obtained by repeatedly forming a second concavity or a second convexity in the direction along a surface of the optical element on which surface the antireflective structure is formed, a size of the second convexity or the second concavity in the direction along a surface of the optical element on which surface the antireflective structure is formed being larger than a size of the first convexity or the first concavity.

Furthermore, in addition to the above configuration, the antireflective structure of the present invention is arranged such that the first convex structure or the first concave structure and the second concave structure or the second convex structure are each made from opposite convex structure or concave structure.

With the above antireflective structure, the first convex structure is formed and then a repetition of the second concavity larger than the first convexity (second concave structure) is formed due to the presence of the first convex structure, and the second concave structure yields an effect of preventing reflection from an ultraviolet region to a near-infrared region. Thus, an antireflective structure is obtained. Furthermore, the first convex structure and the second concave structure can be consecutively formed by successively carrying out a single process, so that an antireflective structure can be obtained by an extremely simple process. When such a structure is transferred to other base substance, the convex structure and the concave structure are inverted.

In addition, the antireflective structure of the present invention is arranged such that an average cycle of the second concave structure or the second convex structure in the direction along a surface of the optical element on which surface the antireflective structure is formed is 1.2 times to 10 times larger than that of the first convex structure or the first concave structure.

Furthermore, in addition, the antireflective structure of the present invention is arranged such that an average cycle of the first convex structure or the first concave structure in the direction along a surface of the optical element on which surface the antireflective structure is formed is not less than 7 nm and not more than 40 nm.

Furthermore, in addition, the antireflective structure of the present invention is arranged such that an average cycle of the second concave structure or the second convex structure in the direction along a surface of the optical element on which surface the antireflective structure is formed is not less than 28 nm and not more than 250 nm.

With the above antireflective structure, the first convex structure is formed and then the second concave structure having an antireflective effect is formed due to the presence of the first convex structure by a simple process using only sputter-etching. Thus is provided an antireflective structure which can be produced very easily. When such a structure is transferred to other base substance, the convex structure and the concave structure are inverted.

Furthermore, in addition, the antireflective structure of the present invention includes any element selected from the group consisting of V, Cr, Fe, Zr, Nb, Mo, Tc, Ru, Rh, Pd, Hf, Ta, W, Re, Os, Ir, and Pt.

Furthermore, in addition, the antireflective structure of the present invention includes a base substance whose surface is mainly made of any one of Al, Si, Ge or alloy thereof.

With the above antireflective structure, the first convex structure with high periodicity is formed and then the second concave structure having an antireflective effect is formed due to the presence of the first convex structure by a process using sputter-etching.

INDUSTRIAL APPLICABILITY

The present invention is usable as an antireflective structure on the surface of an optical element required to prevent reflection of light, or as an antireflective film on the surface of various transmissive members.

REFERENCE SIGNS LIST 10, 40, 41, 42 Antireflective structure
1a Convexities (small convexities)
2a Concavities (large concavities)
3a Concavities (small concavities)
4a Convexities (large concavities)
104 Base substance
404 Second base substance
406 Third base substance
103, 203, 303 Supply source

The invention claimed is:

1. An antireflective structure for preventing reflection of light, comprising:
   a plurality of large concavities each having a plurality of small convexities thereon,
   a pitch between the plurality of small convexities and a pitch between the plurality of large concavities being smaller than a wavelength of visible light incident to the antireflective structure, wherein the antireflective structure includes a discrete surface area between the large concavities that does not include small convexities and wherein one of the plurality of concavities is completely surrounded by the discrete surface area.

2. The antireflective structure as set forth in claim 1, wherein an average pitch between the plurality of large concavities is 1.2 times to 10 times larger than an average pitch of the plurality of small convexities.

3. The antireflective structure as set forth in claim 1, wherein an average pitch between the plurality of small convexities is not less than 7 nm and not more than 40 nm.

4. The antireflective structure as set forth in claim 1, wherein an average pitch between the plurality of large concavities is not less than 28 nm and not more than 250 nm.

5. The antireflective structure as set forth in claim 1, wherein each of the plurality of small convexities contains one of V, Cr, Fe, Zr, Nb, Mo, Tc, Ru, Rh, Pd, Hf, Ta, W, Re, Os, Ir, and Pt.

6. The antireflective structure as set forth in claim 1, further comprising a base substance on which the plurality of small convexities are formed, a surface of the base substance containing one of Al, Si, and Ge or an alloy thereof.

7. An optical element, comprising on its surface an antireflective structure as set forth in claim 1.

8. The antireflective structure as set forth in claim 1, wherein an area of the antireflective structure that does not form a portion of the plurality of large concavities has the plurality of small convexities formed thereon.

9. The antireflective structure as set forth in claim 1, wherein each of the plurality of large concavities includes a continuous side wall enclosing each respective concavity and the plurality of concavities are located separately.

10. A process for production of an antireflective structure by forming an antireflective structure on a surface of a base substance, comprising the steps of:
    (i) ejecting molecules or atoms of a base substance material constituting the base substance by etching the surface of the base substance, and at a same time supplying from a supply source a supply material which is to be combined with the base substance material to form particles; and
    (ii) forming a plurality of convexities on the surface of the base substance with a pitch smaller than a wavelength of visible light incident to the antireflective structure by mixing the base substance material ejected in the step (i) with the supply material supplied in the step (i),
    the step (i) and the step (ii) being carried out repeatedly so that a plurality of concavities each having the plurality of convexities thereon are formed on the surface of the base substance with a pitch smaller than the wavelength of the visible light, wherein the antireflective structure includes a discrete surface area between the concavities that does not include small convexities and wherein one of the plurality of concavities is completely surrounded by the discrete surface area.

11. The process as set forth in claim 10, wherein each of the plurality of concavities includes a continuous side wall enclosing each respective concavity and the plurality of concavities are located separately.

* * * * *